(12) United States Patent
Tanabe

(10) Patent No.: US 7,176,955 B2
(45) Date of Patent: Feb. 13, 2007

(54) IMAGE RECORDING APPARATUS AND RECORDING-MATERIAL FEEDING METHOD

(75) Inventor: Tsuyoshi Tanabe, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 171 days.

(21) Appl. No.: 11/058,276

(22) Filed: Feb. 16, 2005

(65) Prior Publication Data

US 2005/0185013 A1 Aug. 25, 2005

(30) Foreign Application Priority Data

Feb. 20, 2004 (JP) ............... 2004-045146

(51) Int. Cl.
*B41J 17/00* (2006.01)
*B41J 13/10* (2006.01)
*B65H 5/04* (2006.01)

(52) U.S. Cl. .......... 347/215; 400/625; 271/274

(58) Field of Classification Search ........ 347/215–216, 347/104, 197–198; 400/600.2, 600.3, 608.4, 400/611, 621, 621.1, 625, 629, 635, 636, 400/636.3, 637, 637.1; 271/274
See application file for complete search history.

(56) References Cited

U.S. PATENT DOCUMENTS 6,341,861 B1 * 1/2002 Sasaki ............ 347/104

6,893,175 B2 * 5/2005 Sussmeier et al. ....... 400/608.4
7,048,457 B2 * 5/2006 Harris ............. 400/635

FOREIGN PATENT DOCUMENTS

| JP | 8-314022 A | 11/1996 |
|---|---|---|
| JP | 11-46262 A | 2/1999 |
| JP | 2003-241321 A | 8/2003 |

* cited by examiner

*Primary Examiner*—K. Feggins
(74) *Attorney, Agent, or Firm*—Sughrue Mion, PLLC

(57) ABSTRACT

A feeder is provided inside an exposure section of a photographic printer. First and second feed-roller pairs are respectively disposed at an upstream side and a downstream side of an exposing position of the feeder. A first nip roller of the first feed-roller pair and a second nip roller of the second feed-roller pair are movable between a nip position for nipping paper sheets, and a release position for releasing the nip thereof. The second nip roller is moved to the nip position after an anterior end of the paper sheet situated at the most upstream side has passed the second nip roller. The first nip roller is moved to the release position before a posterior end of the paper sheet situated at the most downstream side leaves the first nip roller.

20 Claims, 14 Drawing Sheets

IMAGE RECORDING APPARATUS AND RECORDING-MATERIAL FEEDING METHOD

BACKGROUND OF THE INVENTION

1. Field of the Invention

The present invention relates to a method for feeding cut-sheet-shaped recording materials carried in parallel, and further relates to an image recording apparatus applying this feeding method.

2. Description of the Related Art

For example, in a photographic printer, an image is recorded by so-called scanning exposure. In this photographic printer, while a photosensitive material of a cut-sheet shape is nipped and fed in a sub-scanning direction by using a plurality of feed-rollers, recording light is scanned in a scanning direction perpendicular to the sub-scanning direction. In order to improve processing ability (number) of unit time, it is performed by preference that the photosensitive materials having an identical size or different sizes are arranged in the scanning direction and are simultaneously exposed (see Japanese Patent Laid-Open Publication No. 08-314022).

It is necessary for obtaining a high-quality photo print that the photosensitive material is accurately fed at the time of scanning exposure. When an anterior end of the photosensitive material butts against a feed-roller pair and a posterior end thereof leaves from the feed-roller pair, load fluctuation is caused by a shock at that time. Due to this, scanning unevenness occurs so that the quality of the photo print remarkably deteriorates. In view of this, such as described in Japanese Patent Laid-Open Publication No. 11-046262, when the anterior end of the photosensitive material reaches the feed-roller pair disposed at a downstream side of an exposure position, a nip state of this feed-roller pair is released. The photosensitive material is nipped after the anterior end thereof has passed the rollers of the feed-roller pair. And then, before the posterior end of the photosensitive material leaves from another feed-roller pair, which is disposed at an upstream side of the exposure position, the nip of this feed-roller pair is released. Meanwhile, in a case the photosensitive materials nipped in parallel are simultaneously exposed, the feed-roller pairs are disposed in parallel, such as described in Japanese Patent Laid-Open Publication No. 2003-241321. These feed-roller pairs are individually changed between the nip state and the release state in accordance with sizes and so forth of the photosensitive materials of the respective rows. Thus, it is possible to prevent the scanning unevenness from occurring even when the photosensitive materials fed in parallel are simultaneously exposed.

By disposing the feed-roller pairs in parallel so as to correspond to the respective rows of the photosensitive materials such as described in the above Publication No. 2003-241321, the scanning unevenness of the entire rows seems to be prevented from occurring. However, since the feed-roller pairs are independently changed between the nip state and the release state, a mechanism thereof becomes complicated. Moreover, when sizes (length in the feed direction) of the photosensitive materials arranged in the scanning direction are different and when positions of the anterior ends are staggered, it is necessary to change nip timing and release timing relative to the photosensitive materials of the adjacent rows. Thus, control becomes complicated. Further, when the nip timing and the release timing of the adjacent feed-roller pairs are different, load fluctuation is caused. As a result, scanning unevenness occurs relative to the adjacent rows. In addition, when the photosensitive material has a wide width so as to overlap with the plural feed-roller pairs, load fluctuation is caused in case the nip timing and the release timing are not properly set relative to the adjacent feed-roller pairs. In this case, the scanning unevenness is likely to occur.

SUMMARY OF THE INVENTION

In view of the foregoing, it is a primary object of the present invention to provide an image recording apparatus and a recording-material feeding method, in which it is prevented without complicating a mechanism and control that scanning unevenness occurs at the time of simultaneous exposure.

In order to achieve the above and other objects, the image recording apparatus according to the present invention comprises a first feed-roller pair and a second feed-roller pair, which are respectively disposed at an upstream side and a downstream side of a record position of a sheet-shaped recording material in a feed direction thereof. While the feed-roller pairs move the recording materials in parallel, an image is recorded at the record position. The image recoding apparatus further comprises a changing mechanism, a detector and a controller. The changing mechanism changes the first and second feed-roller pairs between a nip state for nipping and feeding the recording material and one of a release state and a weak nip state. In the release state, the recording material is released. In the weak nip state, the recording material is nipped by a nipping force being weaker in comparison with the nip state. The detector detects passing of the recording material in each row. The controller controls the changing mechanism on the basis of a detection result of the detector so as to change the second feed-roller pair to the nip state after a lastly detected anterior end of the recording materials fed by the first-roller pair in parallel has passed through the second feed-roller pair kept in one of the release state and the weak nip state.

Moreover, the controller controls the changing mechanism on the basis of the detection result of the detector so as to change the first feed-roller pair to one of the release state and the weak nip state before a firstly detected posterior end of the recording materials fed by the first feed-roller pair in parallel leaves the first feed-roller pair kept in the nip state.

In a preferred embodiment, each of the feed-roller pairs are constituted of a drive roller, which is rotated by a motor, and a movable roller moving between a nip position for nipping the recording material with the drive roller and a release position for releasing the nip of the recording material. A position adjuster adjusts positions of the recording materials in a width direction thereof such that most outside lateral sides of the recording materials fed in parallel are situated so as to be substantially symmetrical about a center line of a balance of nipping by the movable rollers.

Further, it is preferable that the image recording apparatus further comprises a carrying guide, first press rollers and second press rollers. The carrying guide supports the recording materials fed in parallel. The first press roller presses the recording material against the carrying guide between the first feed-roller pair and the record position. The second press roller presses the recording material against the carrying guide between the record position and the second feed-roller pair. The changing mechanism changes the first and second press rollers between a press state for pressing the recording material and a press-releasing state for releasing the press of the recording material. The controller controls the changing mechanism on the basis of the detection result of the detector so as to change the second press roller to the press state after the lastly detected anterior end of the recording materials fed by the first-roller pair in parallel has passed through the second press roller kept in the press-releasing state. In addition, the controller controls the changing mechanism on the basis of the detection result of the detector so as to change the first press roller to the press-releasing state before the firstly detected posterior end of the recording materials leaves the first press roller kept in the press state.

Further, it is preferable that the controller controls the changing mechanism so as to stagger two image recording positions of the recording material to be recorded at the record position. At one of the image recording positions, the image is recorded when the first feed-roller pair kept in the nip state is changed to one of the release state and the weak nip state. At the other of the image recording positions, the image is recorded when the first press roller kept in the press state is changed to the press-releasing state.

Further, it is preferable that the controller controls the changing mechanism so as to stagger two image recording positions of the recording material to be recorded at the record position. At one of the image recording positions, the image is recorded when the second feed-roller pair kept in one of the release state and the weak nip state is changed to the nip state. At the other of the image recording positions, the image is recorded when the second press roller kept in the press-releasing state is changed to the press state.

The detector may include sensors for single-row use, which are disposed for the respective rows of the recording materials fed in parallel. Alternatively, the detector may be a line-shaped sensor capable of detecting passing of the recording materials, which are fed in parallel, at the respective rows thereof.

The recording-material feeding method for the image recording apparatus comprises the step of recording the images at the record position while the recording materials are fed by the first and second feed-roller pairs in parallel. The recording-material feeding method further comprises the steps of detecting the passing of the recording materials fed in parallel, and changing the second feed-roller pair to the nip state on the basis of the detection result of the passing. The second feed-roller pair is changed to the nip state after the lastly detected anterior end of the recording materials fed by the first roller pair in parallel has passed through the second feed-roller pair kept in one of the release state and the weak nip state.

Moreover, the recording-material feeding method further comprises the step of changing the first feed-roller pair to one of the release state and the weak nip state on the basis of the detection result before the firstly detected posterior end of the recording materials fed by the first feed-roller pair in parallel leaves the first feed-roller pair kept in the nip state.

In the image recording apparatus according to the present invention, it is unnecessary to independently nip and release the recording materials at the respective rows. As a result, it is possible without complicating a structure to prevent scanning unevenness from occurring at the time of simultaneous exposure of the recording materials. Moreover, it is possible to prevent the scanning unevenness from occurring due to slight vibration to be caused on the adjacent row at the time of nipping and releasing. Thus, control may be easily conducted. As a result, manufacturing cost of the apparatus may be held down.

Since the position adjuster is provide, it is possible to take the balance of nipping by adjusting the positions of the recording materials in a scanning direction even when the recording materials fed in parallel have different widths.

The image recording positions of the recording material are adapted to be staggered so that the roller causing the scanning unevenness is easily identified.

By the recording-material feeding method according to the present invention, it is similarly possible without complicating the structure to prevent the scanning unevenness from occurring at the time of the simultaneous exposure.

BRIEF DESCRIPTION OF THE DRAWINGS

The above objects and advantages of the present invention will become apparent from the following detailed description of the preferred embodiments of the invention when read in conjunction with the accompanying drawings, in which:

FIGS. 5A and 5B are schematic illustrations of the feeder viewed in an X-direction shown in FIG. 4, wherein FIG. 5A shows a case in that recording-paper sheets fed in parallel have an identical size (width) and FIG. 5B shows another case in that the recording-paper sheets fed in parallel have different sizes (widths);

FIGS. 17A and 17B are schematic illustrations, wherein FIG. 17A shows the second feed-roller pair kept in a weak nip state, and FIG. 17B shows the first feed-roller pair kept in a weak nip state; and FIGS. 18A and 18b are schematic illustrations, wherein FIG. 18A shows another second feed-roller pair kept in a weak nip state, and FIG. 18B shows another first feed-roller pair kept in a weak nip state.

DETAILED DESCRIPTION OF THE PREFERRED EMBODIMENT(S)

Figure 1:
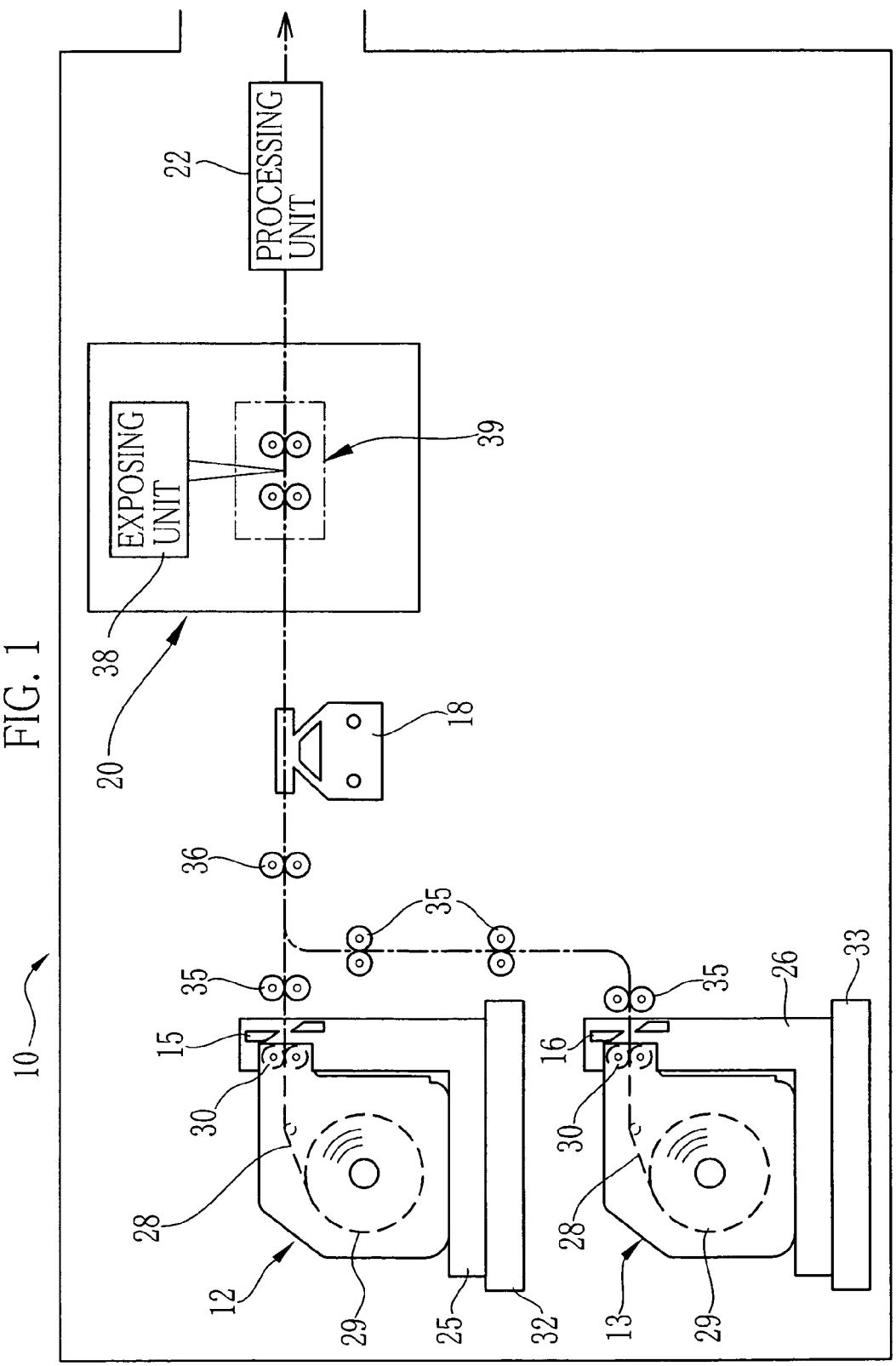
FIG. 1 is a schematic illustration of a photographic printer according to the present invention.

FIG. 1 is a schematic illustration showing a photographic printer 10 according to the present invention. In this printer 10, cut-sheet-shaped photosensitive materials of two rows are fed and simultaneously exposed. The exposed photosensitive material is outputted as a photo print. As shown in FIG. 1, the photographic printer 10 is constituted of magazines 12 and 13, cutters 15 and 16, a back-printing unit 18, an exposure section 20, a processing unit 22, and so forth.

The magazines 12 and 13 are set to magazine stands 25 and 26 vertically disposed in parallel. Each of the magazines 25 and 26 contains a recording-paper roll 29 formed by rolling a strip of a photosensitive recording paper 28 being as a photosensitive material. A paper roller pair 30 is disposed near a paper mouth of the respective magazines 12 and 13. Upon rotating the paper roller pair 30 by means of a motor, which is not shown, the recording paper 28 is drawn out of the recording-paper roll 29 and is advanced to the respective cutters 15 and 16.

The cutters 15 and 16 are respectively disposed so as to nip a passage of the recording paper 28. When an anterior end of the recording paper 28 is advanced from the cutter by a predetermined length, a cutter driving mechanism not shown is actuated to cut the recoding paper 28 into a paper sheet 31 (see FIG. 2) having the predetermined length. By the way, instead of providing two cutters, a single cutter may be disposed near the back-printing unit 18.

Figure 2:
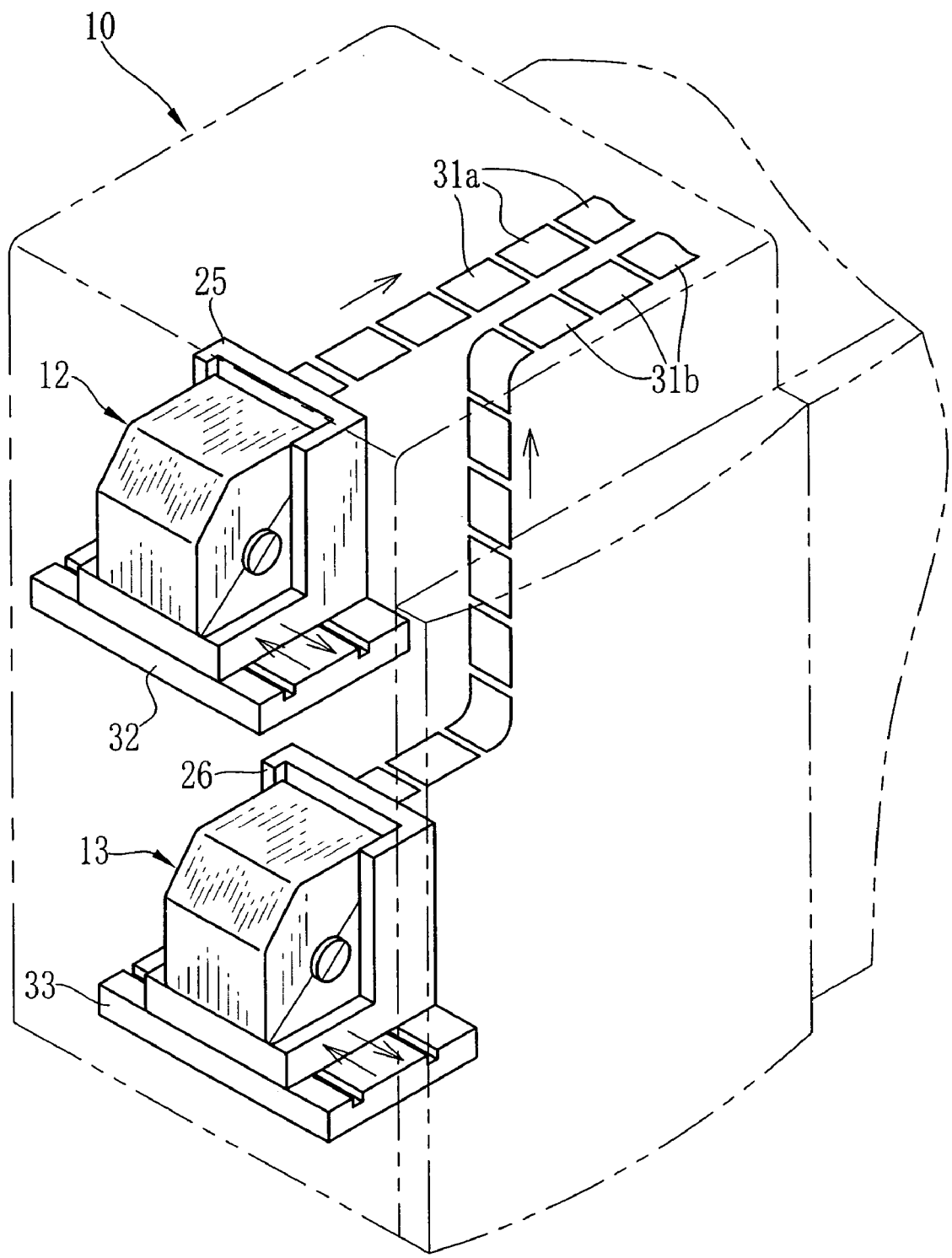
FIG. 2 is a perspective view showing an arrangement of magazines contained in the photographic printer.

The magazine stands 25 and 26 are respectively fixed to magazine-stand moving mechanisms 32 and 33. As shown in FIG. 2, the magazine-stand moving mechanisms 32 and 33 respectively slide the magazine stands 25 and 26 in a scanning direction perpendicular to a feeding direction (sub-scanning direction). Incidentally, moving the magazine stands 25 and 26 with the mechanisms 32 and 33 is performed by utilizing belt drive, screw drive, rack-and-pinion drive and so forth. In virtue of this, positions of the paper sheets 31a and 31b to be advanced from the respective magazines 12 and 13 can be adjusted in a width direction of the paper sheet (in the scanning direction). Thus, it is possible to forward the paper sheets 31a and 31b having any widths, into the passage.

As shown in FIG. 1, the paper sheets 31a and 31b advanced from the magazines 12 and 13 are carried by a plurality of carrying roller pairs 35 and 36 disposed at the passages. The paper sheets 31a and 31b are carried along the passages shown by dashed lines in the drawing to pass through the back-printing unit 18, the exposure section 20 and the processing unit 22 in this order. On this occasion, timing for advancing the paper sheets 31a and 31b from the respective magazines 12 and 13 toward the passages is adjusted beforehand so as to carry the paper sheets 31a and 31b from the respective magazines 12 and 13 in parallel. The back-printing unit 18 prints necessary information of film ID, a frame number and so forth on rear surfaces of the paper sheets 31a and 31b (surfaces opposite to recording surface).

The paper sheets 31a and 31b for which back printing has been performed are carried in parallel toward the exposure section 20 after a skew of the paper sheet has been corrected as need arises. The exposure section 20 is constituted of an exposing unit 38 and a feeder 39. The exposing unit 38 comprises a laser printer and an image memory, which are well known. The image memory stores image data read by a film scanner not shown. Alternatively, the image memory stores image data outputted from a recording medium of a memory card or the like. The laser printer scans recording light (laser beam), intensity of which is modulated in accordance with an image to be recorded, in the scanning direction perpendicular to the feeding direction (sub-scanning direction) to simultaneously print the images on the paper sheets 31a and 31b of two rows. Although the feeder 39 is described later in detail, nip states of the paper sheets 31a and 31b are changed in accordance with feed positions of the paper sheets 31a and 31b to reduce load fluctuation during scanning exposure. The exposed paper sheets 31a and 31b are forwarded to the processing unit 22 wherein various processes of coloring/developing, fixing and washing are executed. In the processing unit 22, a drying process is further executed. And then, the paper sheet is discharged to the outside of the photographic printer 10 as a photo print.

Figure 3:
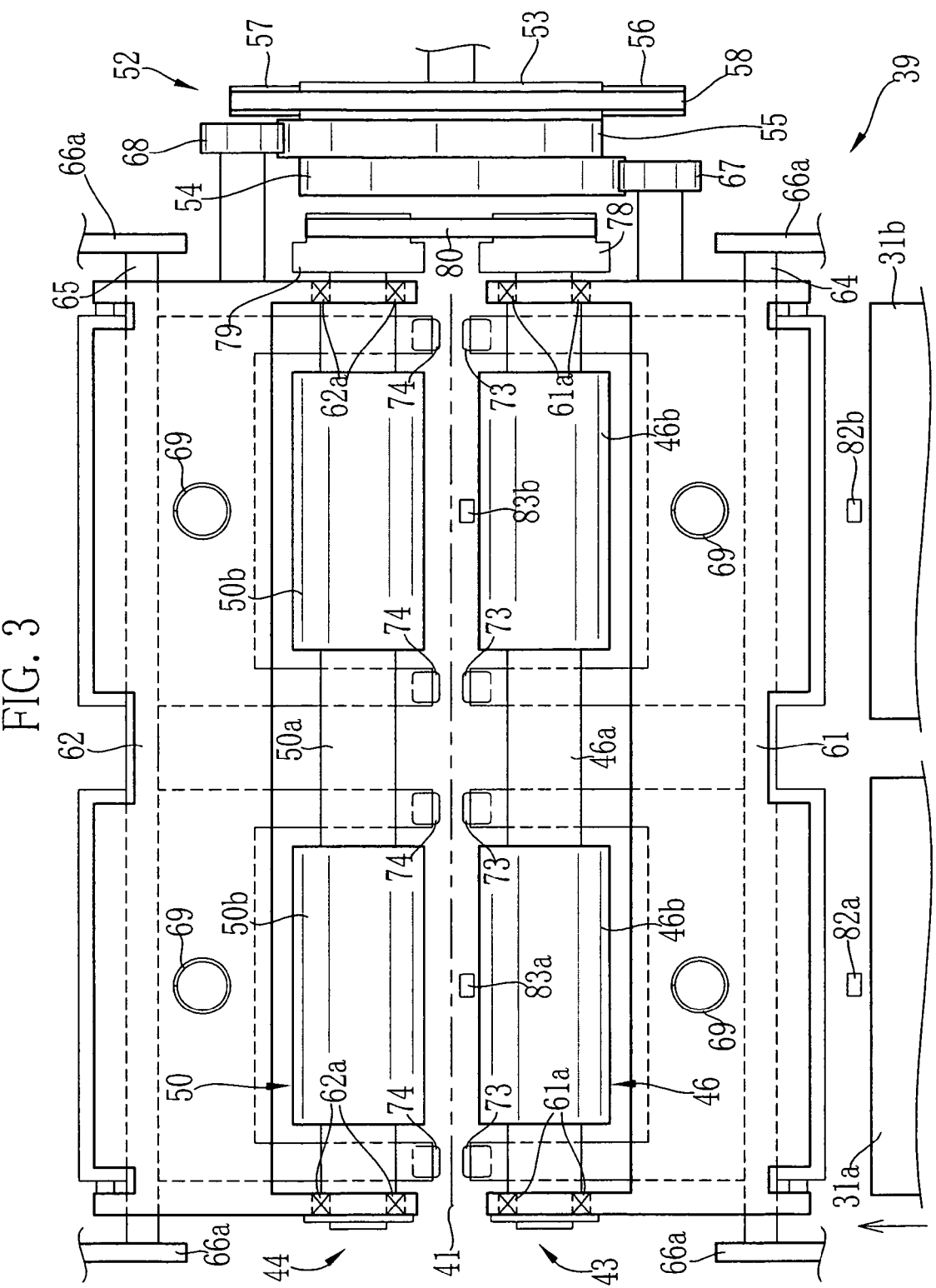
FIG. 3 is atop view of a feeder included in an exposure section of the photographic printer.
Figure 4:
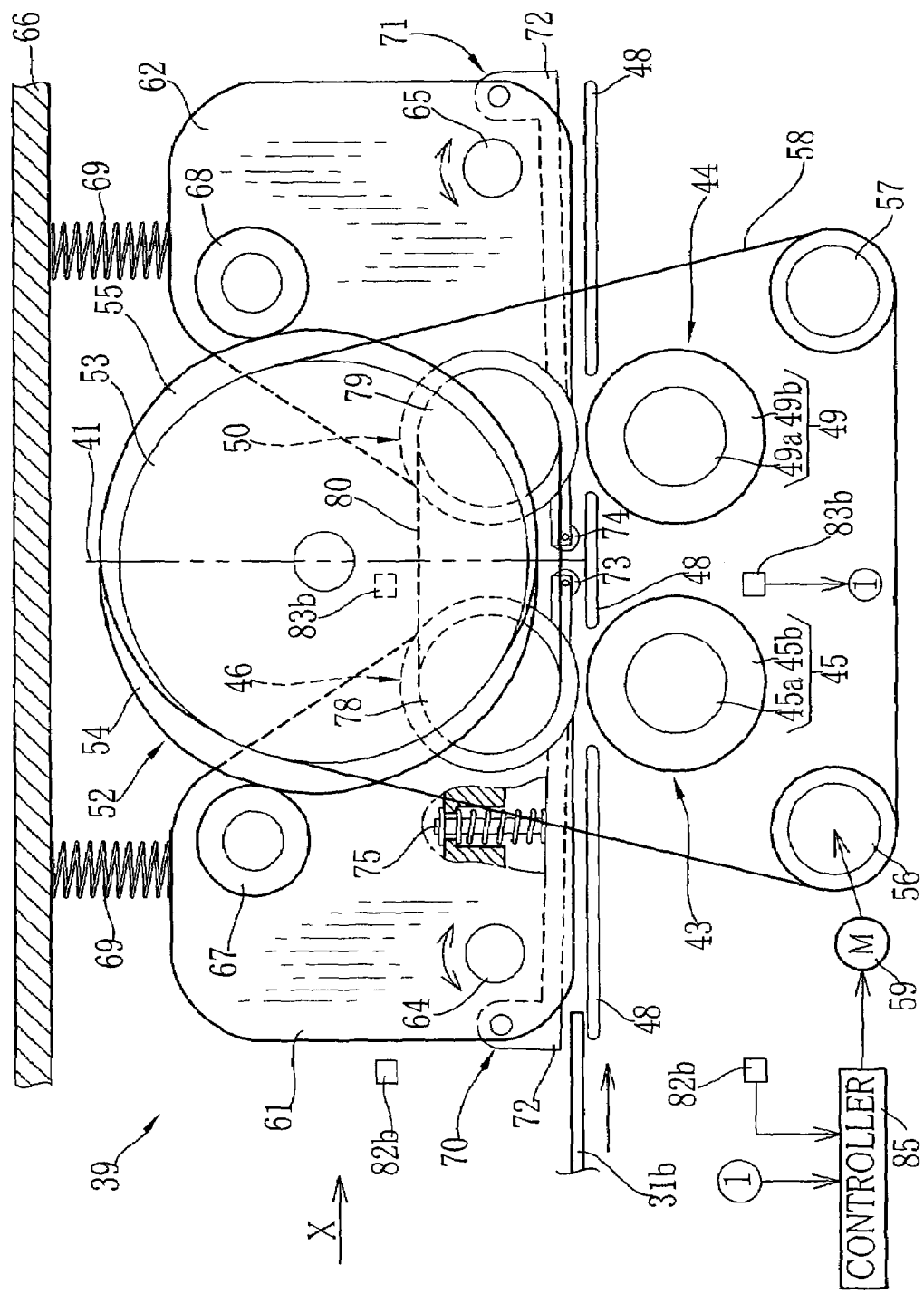
FIG. 4 is a side view of the feeder shown in FIG. 3.

Next, the feeder 39 is described below with FIGS. 3 and 4. FIG. 3 is a top view of the feeder 39 and FIG. 4 is a side view thereof. As shown in FIGS. 3 and 4, the feeder 39 comprises a first feed-roller pair 43 and a second feed-roller pair 44, which are respectively disposed at an upstream side and a downstream side of an exposing position 41 where scanning exposure is performed by the exposing unit 38.

The first feed-roller pair 43 is constituted of a first capstan roller 45, which is rotated by a motor not shown, and a first nip roller 46 being as a driven roller. The respective rollers 45 and 46 are disposed so as to nip a guide plate 48 supporting the paper sheets 31a and 31b. Incidentally, the first capstan roller 45 corresponds to a first drive roller of the present invention, and the first nip roller 46 corresponds to a first movable roller of the present invention. As to the first capstan roller 45 and the first nip roller 46 currently used, rubber rolls 45b and 46b are respectively fixed to rotary shafts 45a and 46a by a number (two) of the rows of the paper sheets 31a and 31b. In this embodiment, the rubber rolls 46b (also the rubber rolls 45b) of which the number is two are disposed at positions to press central areas of the paper sheets 31a and 31b. However, this is not exclusive. The number of the rubber rolls may be three or more on condition that the paper sheets 31a and 31b are pressed in balance. In another way, the paper sheets 31a and 31b may be pressed by a single rubber roll having a sufficient length.

The second feed-roller pair 44 has a structure identical with that of the first feed-roller pair 43, and is constituted of a second capstan roller 49 and a second nip roller 50. Incidentally, the second capstan roller 49 corresponds to a second drive roller of the present invention, and the second nip roller 50 corresponds to a second movable roller of the present invention. As to the second capstan roller 49 and the second nip roller 50 currently used, rubber rolls 49b and 50b are respectively fixed to rotary shafts 49a and 50a by a number (two) of the rows of the paper sheets 31a and 31b. Meanwhile, a belt not shown is laid between the first capstan roller 45 and the second capstan roller 49 so that these rollers are rotated at identical peripheral velocity by the same motor (not shown).

Figure 5A:
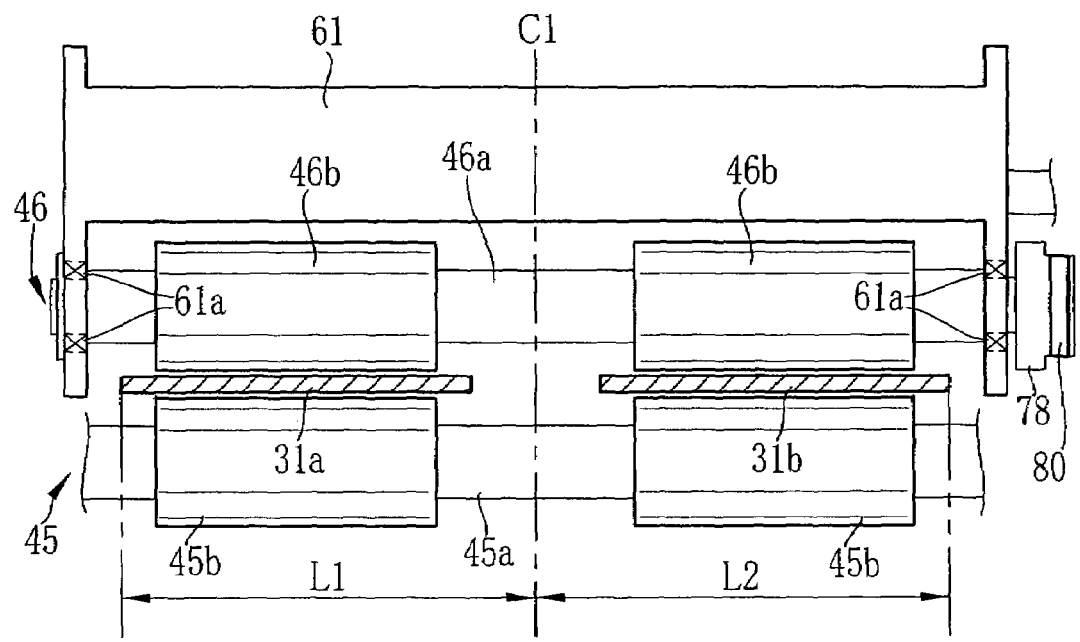
Figure 5B:
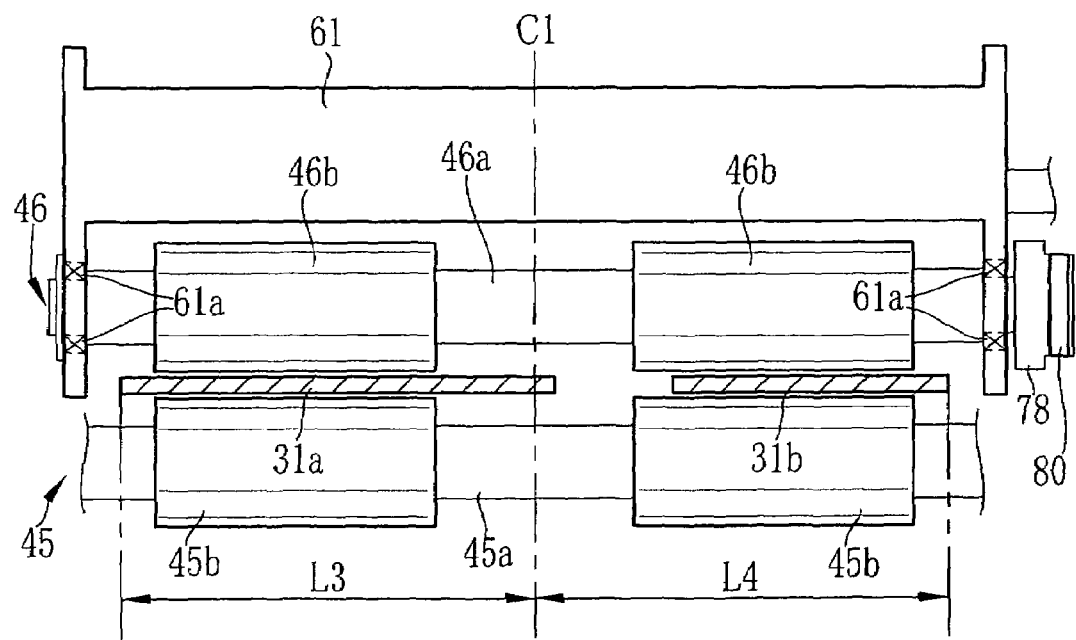

In case the paper sheets 31a and 31b fed in parallel are biased toward one end of the first nip roller 46 (the second nip roller 50), a balance of nipping deteriorates so that an advancement amount of the paper sheet is likely to fluctuate. Moreover, in this case, since an edge of the paper sheet in a width direction is nipped, a skew is likely to be caused. In view of this, the magazine-stand moving mechanisms 32 and 33 are actuated to move the magazines 12 and 13 in the scanning direction such that outermost side edges of the paper sheets 31a and 31b existing in the passage become substantially symmetrical about a center line C1 of the balance of nipping in the scanning direction of the first nip roller 46 (second nip roller 50), such as shown in FIG. 5A which is a schematic illustration viewed in an X-direction in FIG. 4 (structure is partially abbreviated in the drawing). In other words, the magazine-stand moving mechanisms 32 and 33 are actuated to move the magazines 12 and 13 in the scanning direction such that a length L1 extending from one side of the paper sheets 31a and 31b to the center line C1 of the balance of nipping is substantially equal to a length L2 extending from the other side of the paper sheets 31a and 31b to the center line C1. Meanwhile, such as shown in FIG. 5B, when the paper sheets 31a and 31b have different widths, the magazine-stand moving mechanisms 32 and 33 are actuated such that a length L3 extending from one side of the paper sheets 31a and 31b to the center line C1 of the balance of nipping is substantially equal to a length L4 extending from the other side of the paper sheets 31a and 31b to the center line C1. It is possible to adjust the positions of the respective paper sheets 31a and 31b in the scanning direction to strike the balance of nipping.

As shown in FIGS. 3 and 4, the first and second feed-roller pairs 43 and 44 respectively nip and release the paper sheets 31a and 31b by vertically moving the first and second nip rollers 46 and 50 in the drawing. In this embodiment, a cam unit, 52 is used as a mechanism for moving the first and second nip rollers 46 and 50. By rotating the cam unit 52, the first and second nip rollers 46 and 50 are moved between a nip position where the paper sheets 31a and 31b are nipped, and a release position where the nip state is released.

The cam unit 52 is constituted of a drive cam 53, a first cam 54 and a second cam 55. Incidentally, the respective cams 53, 54 and 55 are arranged in an axis direction of the first and second nip rollers 46 and 50. Two pulleys 56 and 57 are provided to rotate the drive cam 53, and a timing belt 58 is laid between these pulleys and the drive cam 53. Further, a motor 59 is connected to the pulley 56. Upon rotating the pulley 56 by the motor 59, the drive cam 53 is rotated via the timing belt 58 to rotate the first cam 54 and the second cam 55.

In order to move the first and second nip rollers 46 and 50 between the nip position and the release position by utilizing the rotations of the first cam 54 and the second cam 55, brackets 61 and 62 are provided so as to rotatably support the first and second nip rollers 46 and 50. The brackets 61 and 62 are rotatably attached to rotary shafts 64 and 65 fixed to side plates 66a (see FIG. 3, not shown in FIG. 4) forming a frame 66 (see FIG. 4) of the feeder 39. The rotary shafts 64 and 65 are parallel with the axial direction of the first and second nip rollers 46 and 50. Lateral sides of the brackets 61 and 62 are respectively provided with cam followers 67 and 68 to abut on the peripheries of the first and second cams 54 and 55. The cam followers 67 and 68 are respectively urged toward the peripheries of the first and second cams 54 and 55 by means of springs 69 disposed between the frame 66 and the brackets 61 and 62. Thus, by rotating the first and second cams 54 and 55, the cam followers 67 and 68 are swung so that the brackets 61 and 62 are also swung around the rotary shafts 64 and 65. Consequently, the first and second nip rollers 46 and 50 are moved between the nip position and the release position.

In this embodiment, the brackets 61 and 62 are formed from a metal rigid material of aluminum, for example, so as to rotatably support the first and second nip rollers 46 and 50 via bearings 61a and 62a (see FIG. 3). First pressing mechanisms 70 and second pressing mechanisms 71 are respectively attached to the insides of the brackets 61 and 62 two by two. The pressing mechanisms 70 and 71 press the paper sheets 31a and 31b against the guide plate 48 to prevent anterior portions and posterior portions of the paper sheets 31a and 31b from levitating at the exposing position 41. The first pressing mechanisms 70 press the paper sheets 31a and 31b between the exposing position 41 and the first feed-roller pair 43. The second pressing mechanisms 71 press the paper sheets 31a and 31b between the exposing position 41 and the second feed-roller pair 44.

The first and second pressing mechanisms 70 and 71 are constituted of arm members 72, a first press roller 73 and a second press roller 74. The arm member 72 has a plate shape, and the rollers 73 and 74 are rotatably attached to top ends of the arm members 72. The other ends of the arm members 72 are rotatably attached to the brackets 61 and 62 (see FIG. 4). A spring mechanism 75 (not shown in FIG. 3) comprising a spring and a shaft is attached to a central portion of the arm member 72. The other ends of the spring mechanisms 75 are attached to the insides of the brackets 61 and 62. The spring mechanism 75 is shrunk at the time of pressing. As a shrinkage amount of the spring mechanism 75 changes, a pressing force of the press roller pressing the paper sheet also changes. For example, the shrinkage amount of the spring is reduced as the bracket 61 rotates in a counterclockwise direction in the drawing to move the first nip roller 46 from the nip position to the release position. In association with this, the pressing force of the first press roller 73 is reduced. Incidentally, although illustration is abbreviated, a stopper is formed on the bracket to maintain an attachment angle of the arm member 72 within a predetermined range relative to the bracket. The stopper abuts on the bottom of the arm member 72 to prevent further rotation of the arm member 72, for example. Meanwhile, attachment positions of the first and second press rollers 73 and 74 are not limited to the positions existing between the rubber rolls 46b and 50b of the first and second nip rollers 46 and 50 such as shown in FIG. 4. Many rollers may be arranged at a downstream side of the rubber roll 46b and at an upstream side of the rubber roll 50b. The number of the rollers may be increased and decreased as need arises in accordance with stiffness of the paper sheet 31, on condition that the anterior end and the posterior end of the paper sheet are prevented from levitating. Further, the attachment positions of the rollers may be optionally determined.

The first and second press rollers 73 and 74 are moved among a press position, a provisional press position and a release position by utilizing the rotation of the cam unit 52 similarly to the first and second nip rollers 46 and 50. In the press position, the paper sheets 31a and 31b are pressed. In the provisional press position, the paper sheets 31a and 31b are pressed by a weak pressing force. In the release position, pressing the paper sheet is released. The provisional press position is located between the press position and the release position. In the provisional press position, the paper sheets 31a and 31b are weakly pressed against the guide plate 48 only by the first and second press rollers 73 and 74.

Pulleys 78 and 79 having the same diameter are respectively attached to lateral sides of the first and second nip rollers 46 and 50. An extensible flat belt 80 is laid between the pulleys 78 and 79. Thus, when one of the first nip roller 46 and the second nip roller 50 is rotated, the other nip roller is rotated in the same direction and at the same velocity. In virtue of this, when either of the nip rollers is rotated in the direction for advancing the paper sheets 31a and 31b, it is possible to nip and release the paper sheets 31a and 31b in a state that the other nip roller is rotated in the same direction and at the same velocity. As a result, shock is reduced at the time of nipping and releasing so that it is possible to prevent scanning unevenness from occurring.

The first and second nip rollers 46 and 50 are different from rollers described in the above-mentioned Publication No. 2003-241321. In the present invention, in order to simultaneously nip and release the paper sheets 31a and 31b fed in parallel, the second nip roller 50 and the second press roller 74 are moved to the nip position and the press position respectively after the anterior end of either of the paper sheets 31a and 31b, which is situated at the upstream side in the feed direction of the paper sheet, has passed through the second nip roller 50 and the second press roller 74. Further, in the present invention, the first nip roller 43 and the first press roller 73 are moved to the release position and the press releasing position respectively before the posterior end of either of the paper sheets 31a and 31b, which is situated at the downstream side in the feeding direction, leaves the first nip roller 43 and the first press roller 73.

For the purpose of detecting the anterior ends and the posterior ends of the paper sheets 31a and 31b fed in parallel, photo sensors 82a and 82b are disposed at an upstream side of the bracket 61 so as to correspond to the respective rows. Moreover, photo sensors 83a and 83b for commencing image recording are disposed between the bracket 61 and the exposing position 41 so as to correspond to the respective rows. Each of the photo sensors 82a, 82b, 83a and 83b comprises a light emitting element and a light receiving element, which are arranged so as to nip the passage of the paper sheets 31a and 31b. A detection signal of each photo sensor is sent to a controller 85 of the photographic printer 10. The controller 85 controls each section of the photographic printer 10 to track the positions of the paper sheets 31a and 31b on the basis of the detection signals outputted from the photo sensors 82a and 82b, and information concerning a feed speed of the paper sheets 31a and 31b. Further, on the basis of the detection signals outputted from the photo sensors 83a and 83b, the exposing unit 38 commences scanning exposure. By the way, in this embodiment, the photo sensors 83a and 83b are provided in consideration of the misalignment of the paper sheets 31a and 31b to occur at the time of passing the first feed roller pair 43. However, when the misalignment hardly occurs, only the photo sensors 82a and 82b may be provided, and the photo sensors 83a and 83b may be omitted. Moreover, in this embodiment, the photo sensors 82a, 82b, 83a and 83b are provided for the respective rows. Instead of this, a photo sensor having a line shape (line sensor) may be provided.

The controller 85 is connected to the photo sensors 82a, 82b, 83a and 83b, the motor 59 and so forth. When the anterior ends and the posterior ends of the paper sheets 31a and 31b are carried to the respective rollers, the controller 85 drives the motor 59 on the basis of the tracking result of the paper sheets 31a and 31b to rotate the cam unit 52. Upon rotation of the cam unit 52, the first and second nip rollers 46 and 50 are respectively moved to the release position, the nip position and the release position in this cyclic order. At the same time, the respective first and second press rollers 73 and 74 are also moved to the press releasing position, the provisional press position, the press position, the provisional press position and the release position in this cyclic order. While the respective paper sheets 31a and 31b pass through the feeder 39, positional combinations of the rollers are set in six ways, which are described later in detail. Shapes and sizes of the first and second cams 54 and 55 are adjusted such that the respective rollers are moved in six ways during one rotation of the cam unit 52.

A rotational velocity for rotating the cam unit 52, namely a moving velocity of each of the rollers 46, 50, 73 and 74 is set to a low velocity so as to prevent the scanning unevenness from occurring on the paper sheets 31a and 31b due to vibration, which is caused especially when the second nip roller 50 is moved from the release position to the nip position and the first nip roller 46 is moved from the nip position to the release position. The rotation of the cam unit 52 may be commenced before the anterior ends and the posterior ends of the paper sheets 31a and 31b pass the corresponding rollers 46, 50, 73 and 74. In particular, when the first nip roller 46 is moved from the nip position to the release position, the rotation of the cam unit 52 may be commenced at the moment that a predetermined period has passed after detecting the transit of the corresponding posterior end by the photo sensors 82a and 82b.

In this embodiment, a press-starting position of the second press roller 74 and a nip-starting position of the second nip roller 50 are determined such that two image-exposure positions of the paper sheets 31a and 31b to be exposed at the exposing position 41 are staggered. When the paper sheets 31a and 31b are nipped by the second nip roller 50 (second feed-roller pair 44), the paper sheets 31a and 31b are exposed at one of the image-exposure positions. When the paper sheets 31a and 31b are pressed by the second press roller 74, the paper sheets 31a and 31b are exposed at the other of the image-exposure positions. On the basis of the determined starting positions for pressing and nipping, are adjusted the rotation of the cam unit 52 and the rotational velocity thereof. In virtue of this, when scanning unevenness has occurred, it is possible to specify the roller having a cause of the scanning unevenness (see FIG. 14), such as described later in detail.

Figure 14:
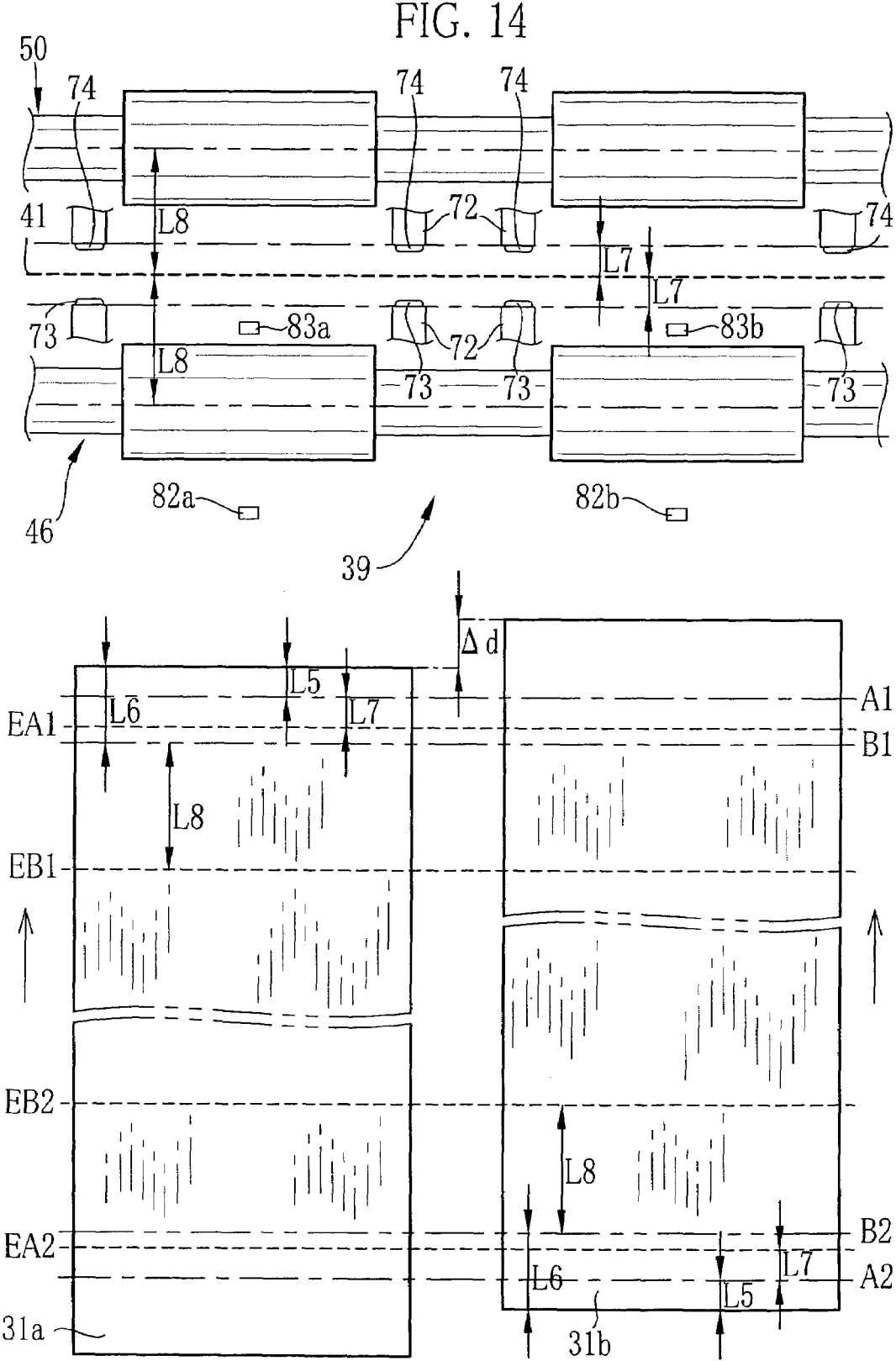
FIG. 14 is a schematic illustration showing the feeder viewed from the top thereof and showing a state in that the recording-paper sheets fed in parallel have an identical size and the anterior ends thereof are staggered.

For the same purpose, a nip-terminating position of the first nip roller 46 and a press-terminating position of the first press roller 73 are determined such that two image-exposure positions of the paper sheets 31a and 31b to be exposed at the exposing position 41 are staggered (see FIG. 14). When the paper sheets 31a and 31b are released from being nipped by the first nip roller 46 (first feed-roller pair 43), the paper sheets 31a and 31b are exposed at one of the image-exposure positions. When the paper sheets 31a and 31b are released from being pressed by the first press roller 73, the paper sheets 31a and 31b are exposed at the other of the image-exposure positions.

Next, an operation of the photographic printer 10 having the above structure is described below with FIGS. 1, 3 to 13. Incidentally, FIGS. 6, 8, 10 and 12 are schematic views illustrated by simplifying FIG. 4, and FIGS. 7, 9, 11 and 13 are schematic views illustrated by simplifying FIG. 3. In association with a print instruction performed by a user, the photosensitive recording papers 28 are advanced from the recording-paper rolls 29 of the respective magazines 15 and 16, and the cutters 15 and 16 cut the recording papers 28 into the paper sheets 31a and 31b having the predetermined length, such as shown in FIG. 1. Moreover, the magazine-stand moving mechanisms 32 and 33 are actuated to adjust the positions of the magazines 12 and 13 in the scanning direction in accordance with the width of the recording-paper roll 29. The paper sheets 31*a* and 31*b* advanced from the respective magazines 12 and 13 are forwarded in parallel to the back-printing unit 18 by the carrying roller pairs 35 and 36. In the back-printing unit 18, the necessary information of the film ID, the frame number and so forth are printed.

Figure 6:
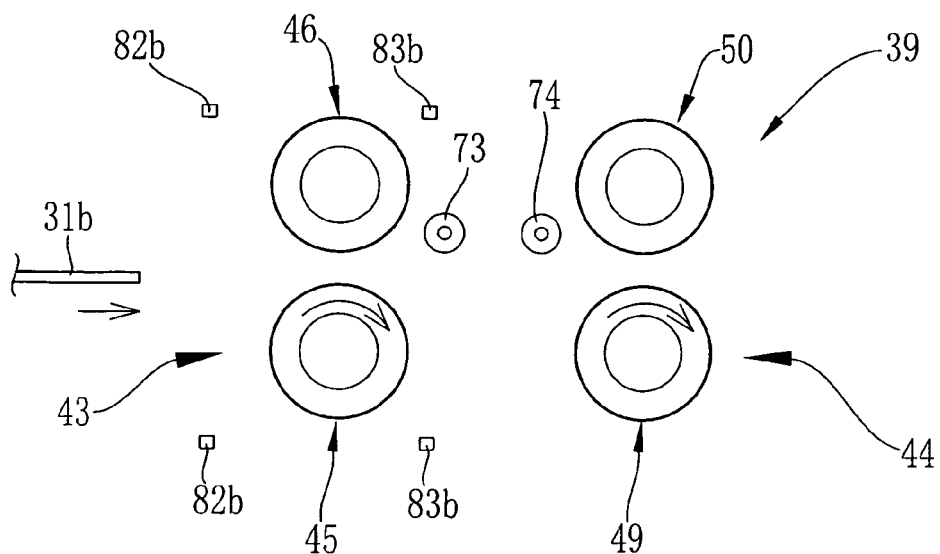
FIG. 6 is a schematic illustration showing the feeder viewed from its side and showing positions of rollers kept in an initial state.
Figure 7:
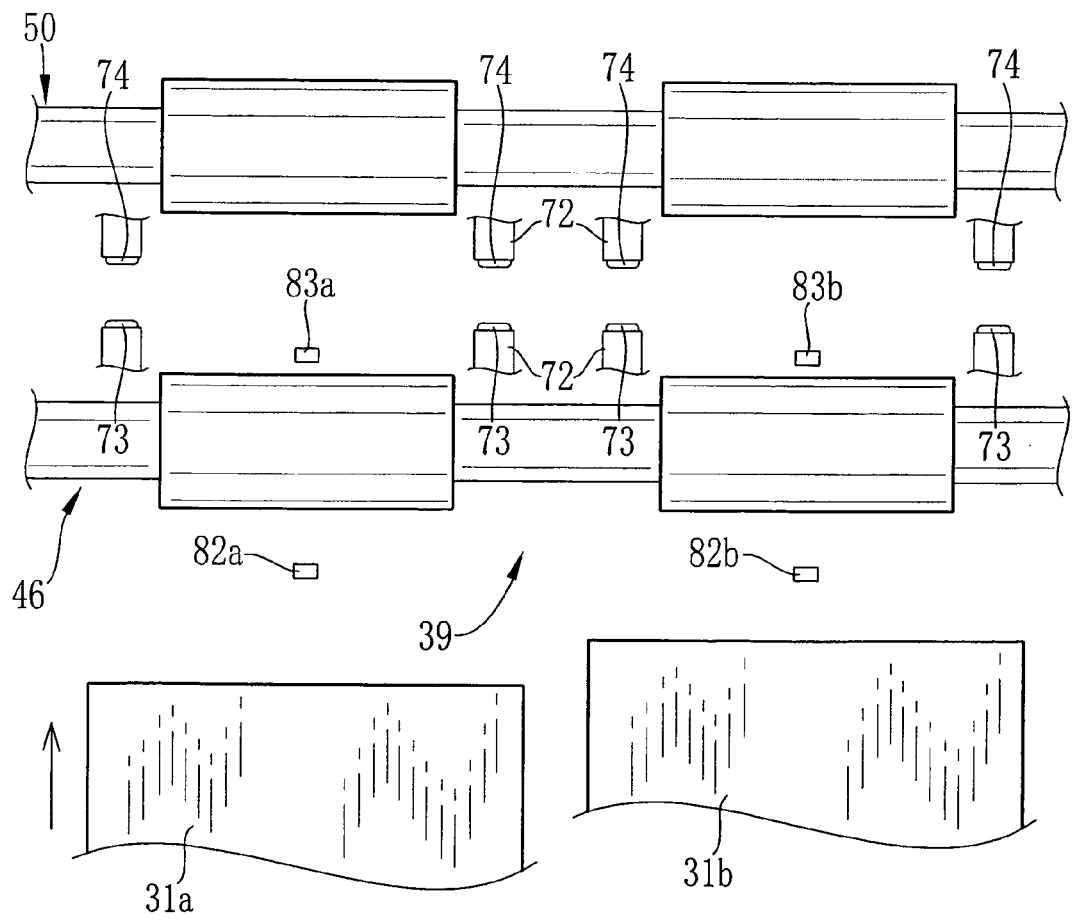
FIG. 7 is a schematic illustration showing the feeder viewed from the top thereof in FIG. 6.

The paper sheets 31*a* and 31*b* for which back printing has been performed are forwarded in parallel to the feeder 39 of the exposure section 20 after the skew has been corrected as need arises. Before the paper sheets 31*a* and 31*b* are forwarded, an initial state is set such as shown in FIGS. 6 and 7. In the initial state, the first and second nip rollers 46 and 50 are kept in the release position, and the first and second press rollers 73 and 74 are kept in the press releasing position (the first combination).

Figure 8:
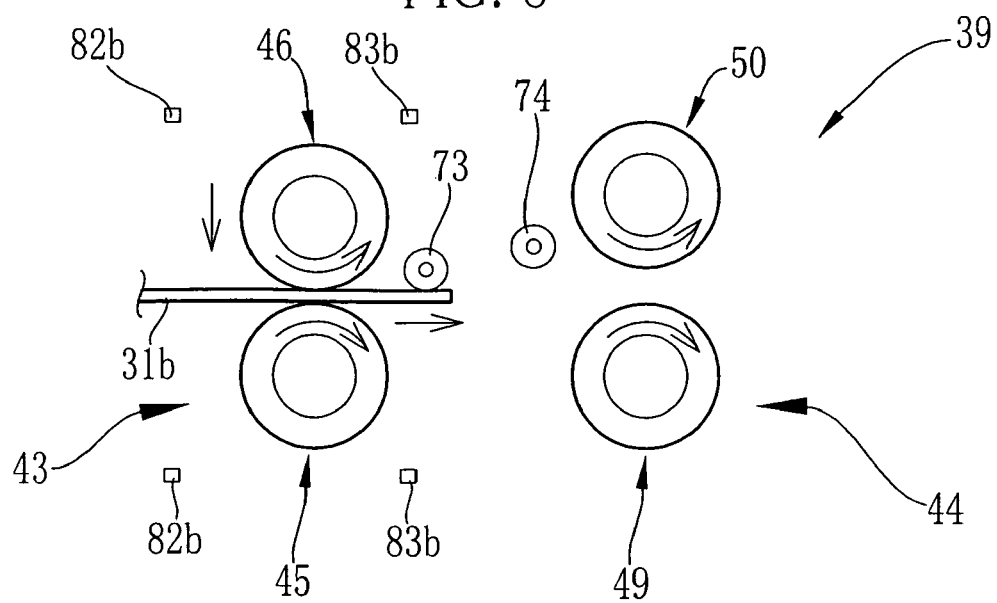
FIG. 8 is a schematic illustration showing the feeder viewed from the side thereof and showing the roller positions in a state that the recording-paper sheet is just carried to the feeder.
Figure 9:
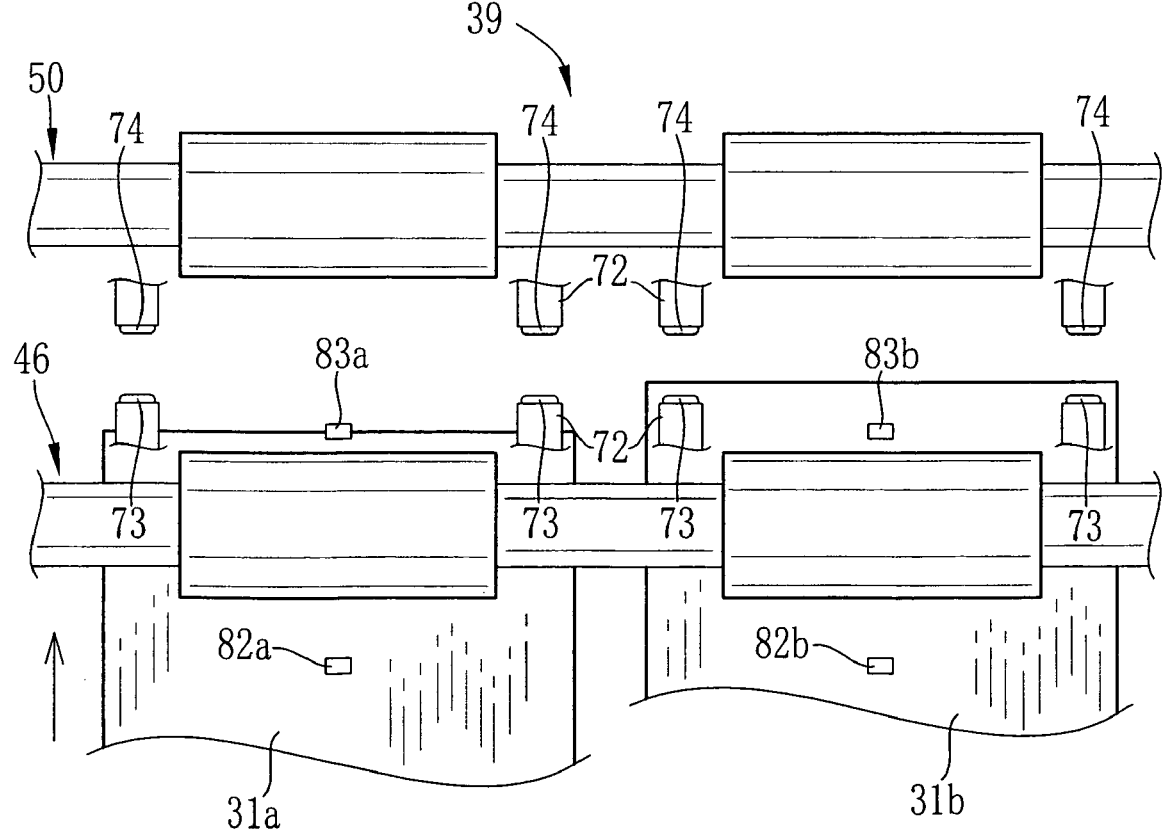
FIG. 9 is a schematic illustration showing the feeder viewed from the top thereof in FIG. 8.

As shown in FIGS. 8 and 9, when the paper sheets 31*a* and 31*b* are forwarded in parallel to the feeder 39, either of the anterior ends thereof is detected by the photo sensors 82*a* and 82*b*. At this time, the controller 85 drives the motor 59 to rotate the cam unit 52 so that the first nip roller 46 and the first press roller 73 are respectively moved toward the nip position and the press position (the second combination). By the way, in this embodiment, the paper sheets 31*a* and 31*b* have the same size, and the paper sheet 31*b* is ahead rather than the paper sheet 31*a*. The first nip roller 46 commences to rotate after moving to the nip position. Upon this, the second nip roller 50 also commences to rotate at the same velocity by means of the pulleys 78, 79 and the flat belt 80.

The paper sheets 31*a* and 31*b* pass the first nip roller 46 and the anterior ends thereof pass the photo sensors 83*a* and 83*b*. The controller 85 activates the exposing unit 38 on the basis of the detection signal, which is outputted from the photo sensors 83*a* and 83*b*, and the feed-speed information of the paper sheets 31*a* and 31*b* to commence the scanning exposure for the paper sheets 31*a* and 31*b*. Further, the controller 85 tracks the position of the paper sheet 31*a* on the basis of the detection signals of the photo sensors 82*a*, 82*b* and the carrying-speed information of the paper sheets 31*a* and 31*b*. At this time, passing of the anterior end of the paper sheet 31*a* is lastly detected. After the anterior end of the paper sheet 31*a* has passed the second press roller 74, the cam unit 52 is rotated to move the second press roller 74 to the provisional press position (the third combination).

Figure 10:
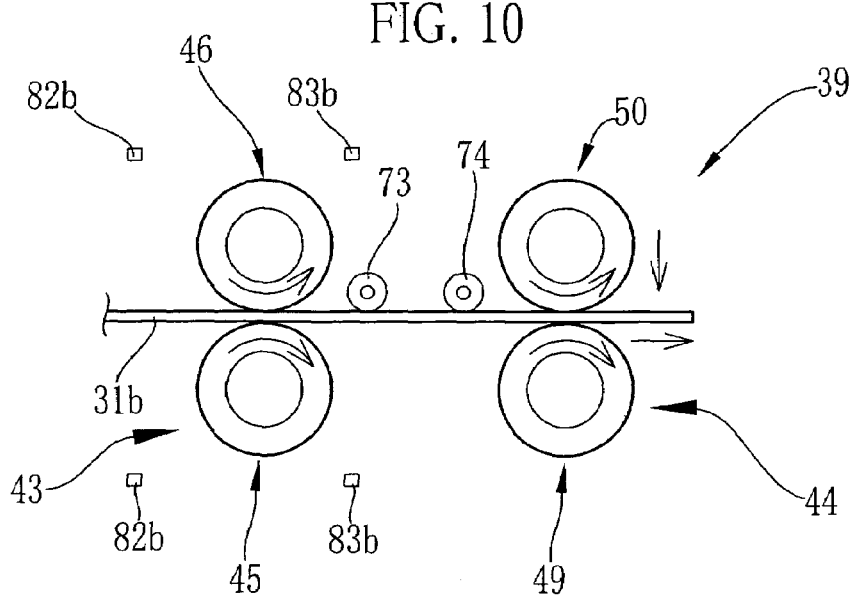
FIG. 10 is a schematic illustration showing the feeder viewed from the side thereof and showing the roller positions in a state that an anterior end of the recording-paper sheet lastly carried has passed through a second feed-roller pair.
Figure 11:
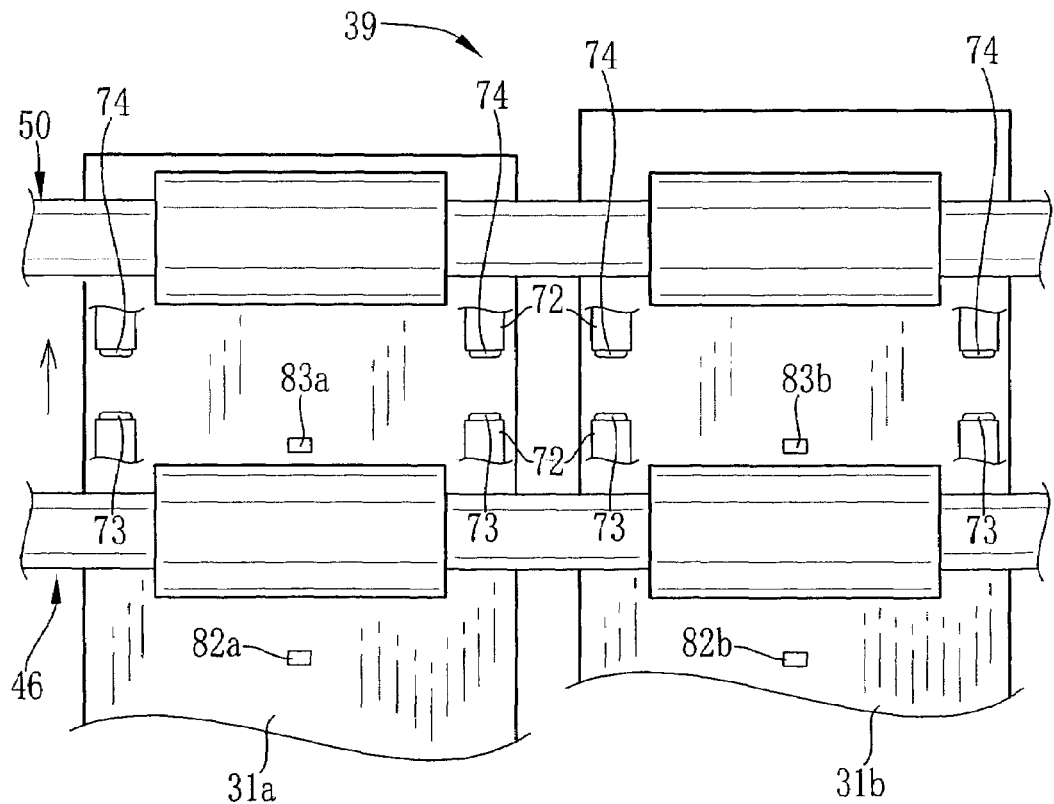
FIG. 11 is a schematic illustration showing the feeder viewed from the top thereof in FIG. 10.

Successively, the paper sheet 31*a* passes through the second feed-roller pair 44. After that, the cam unit 52 is rotated to move the second press roller 74 to the press position, and at the same time, the second nip roller 50 is moved to the nip position such as shown in FIGS. 10 and 11 (the fourth combination). Incidentally, the second nip roller 50 moves to the nip position, rotating in the feed direction of the paper sheets 31*a* and 31*b*, so that a shock is reduced at the time of nipping.

Figure 12:
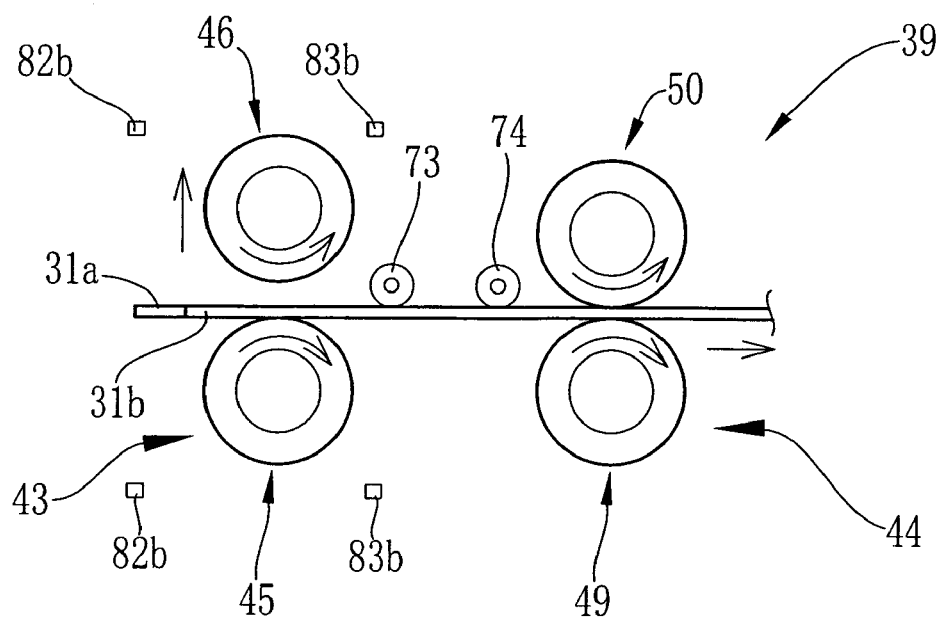
FIG. 12 is a schematic illustration showing the feeder viewed from the side thereof and showing the roller positions in a state that a posterior end of the recording-paper sheet fed first is just about passing through a first feed-roller pair.
Figure 13:
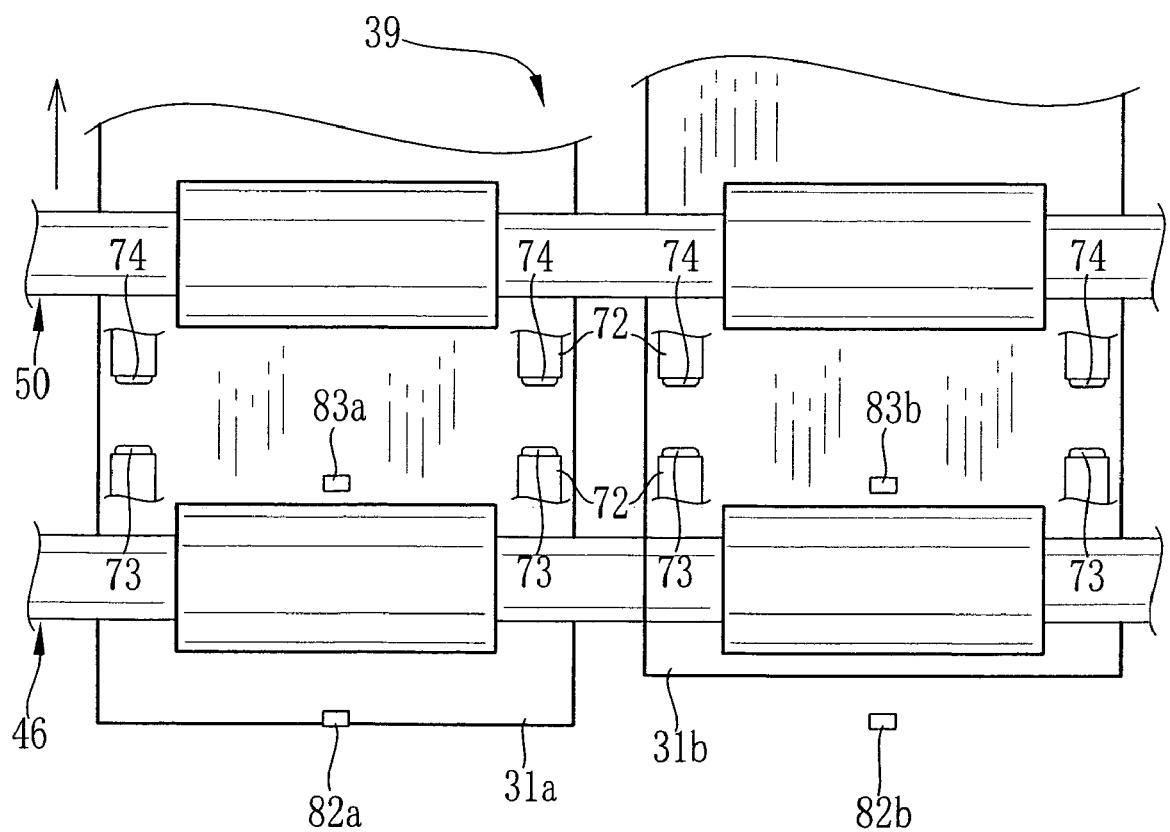
FIG. 13 is a schematic illustration showing the feeder viewed from the top thereof in FIG. 12.

The posterior ends of the respective paper sheets 31*a* and 31*b* pass the photo sensors 82*a* and 82*b*. After that, the controller 85 tracks the position of the paper sheet 31*b* on the basis of the detection signal, which is outputted from the photo sensors 82*a* and 82*b*, and the feed-speed information of the paper sheets 31*a* and 31*b*. In this embodiment, the posterior end of the paper sheet 31*b* is detected first. Before the posterior end of the paper sheet 31*b* leaves the first feed-roller pair 43, the cam unit 52 is rotated to move the first nip roller 46 to the release position, and at the same time, the first press roller 73 is moved to the provisional press position such as shown in FIGS. 12 and 13 (the fifth combination). Incidentally, since the second nip roller 50 rotates, the first nip roller 46 rotates at the same velocity therewith, and in this state, the first nip roller 46 is moved to the release position. Thus, a shock is reduced at the time of releasing the nip. And then, before the posterior end of the paper sheet 31*b* leaves the first press roller 73, the cam unit 52 is rotated to move the first press roller 73 to the press releasing position (the sixth combination).

After the scanning exposure for the paper sheets 31*a* and 31*b* has been completed and all the paper sheets 31*a* and 31*b* have passed through the second feed-roller pair 44, the cam unit 52 is rotated to the position of the initial state to move the second nip roller 50 and the second press roller 74 to the release position and the press releasing position respectively. The above-described processing is repeated when the next paper sheets 31*a* and 31*b* are forwarded to the feeder 39. The shapes, the sizes and so forth of the first and second cams 54 and 55 are adjusted so as to move the respective rollers 46, 50, 73 and 74 in the turn of the above-mentioned six combinations. By merely adjusting the first and second cams 54 and 56, it is possible to prevent the scanning unevenness from occurring even if the paper sheets 31*a* and 31*b* fed in parallel have different sizes, especially have different lengths in the feed direction, and even if the anterior ends of the paper sheets are staggered.

For example, when the anterior ends of the paper sheets 31*a* and 31*b* having the same size are staggered (the paper sheet 31*b* is ahead) such as shown in FIG. 14, the press-starting position of the second press roller 74 (A1 line in the drawing) and the nip-starting position of the second nip roller 50 (B1 line in the drawing) are determined on the basis of the position of the anterior end of the paper sheet 31*a* being behind. In addition, the nip-terminating position of the first nip roller 46 (B2 line in the drawing) and the press-terminating position of the first press roller 73 (A2 line in the drawing) are determined on the basis of the position of the posterior end of the paper sheet 31*b* being ahead.

At this time, the press-starting position (A1 line) and the nip-starting position (B1 line) are determined such that the image-exposure positions (EA1 line and EB1 line) are staggered. The image-exposure position of the EA1 line is exposed when the second press roller 74 has just pressed the paper sheets 31*a* and 31*b*. The image-exposure position of the EB1 line is exposed when the second feed-roller pair 44 has just nipped the paper sheets 31*a* and 31*b*. Moreover, the nip-terminating position (B2 line) and the press-terminating position (A2 line) are determined such that the image-exposure positions (EB2 line and EA2 line) are staggered. The image-exposure position of the EB2 line is exposed when the first feed-roller pair 43 has just released the nip. The image-exposure position of the EA2 line is exposed when the first press roller 73 has just released the press. Hereinafter, reasons for staggering the image-exposure positions are concretely described below.

A shift length Δd of the paper sheets 31*a* and 31*b* are substantially constant unless a kind, a size and so forth of the paper sheets are changed. The Δd may be obtained in advance by experiment and may be obtained on the basis of time-difference information of the paper sheets 31*a* and 31*b* having passed the photo sensors 82*a* and 82*b*. When the Δd is constant, the press-starting position A1 of the second press roller 74 is located at a constant position separating from the anterior end of the paper sheet 31*a* by a length L5. Moreover, the nip-starting position B1 of the second nip roller 50 (second feed-roller pair 44) is located at a constant position separating from the anterior end of the paper sheets 31*a* by a length L6. Further, the nip-terminating position B2 of the first nip roller 46 (first feed-roller pair 43) and the press-terminating position A2 of the first press roller 73 are respectively located at constant positions separating from the posterior end of the paper sheet 31b by the lengths L6 and L5.

In this case, when lengths from the exposing position 41 to the first and second press rollers 73 and 74 are represented as L7, the image-exposure position EA1 is situated at an upstream side of the press-starting position A1 by the length L7. Incidentally, the image-exposure position EA1 is exposed when the second press rollers 74 have started to press the paper sheets 31a and 31b. Meanwhile, the image-exposure position EA2 is situated at a downstream side of the press-terminating position A2 by the length L7. Incidentally, the image-exposure position EA2 is exposed when the first press rollers 73 have just released the paper sheets 31a and 31b. Meanwhile, when lengths from the exposing position 41 to the first and second nip rollers 46 and 50 are represented as L8, the image-exposure position EB1 is situated at an upstream side of the nip-starting position B1 by the length L8. The image-exposure position EB1 is exposed when the second nip roller 50 has started the nip. Moreover, the image-exposure position EB2 is situated at a downstream side of the nip-terminating position B2 by the length L8. The image-exposure position EB2 is exposed when the first nip roller 46 has terminated the nip.

The respective image-exposure positions EA1, EA2, EB1 and EB2 of the paper sheets 31a and 31b are substantially constant unless the kind, the size and so forth of the paper sheet are changed. Thus, when the image-exposure positions EA1 and EB1 are staggered and the image-exposure positions EA2 and EB2 are staggered, it is possible to judge the image-exposure position overlapping with an occurrence position of scanning unevenness in case of occurrence thereof. Consequently, it is possible to specify the roller having a cause of the scanning unevenness.

Figure 15:
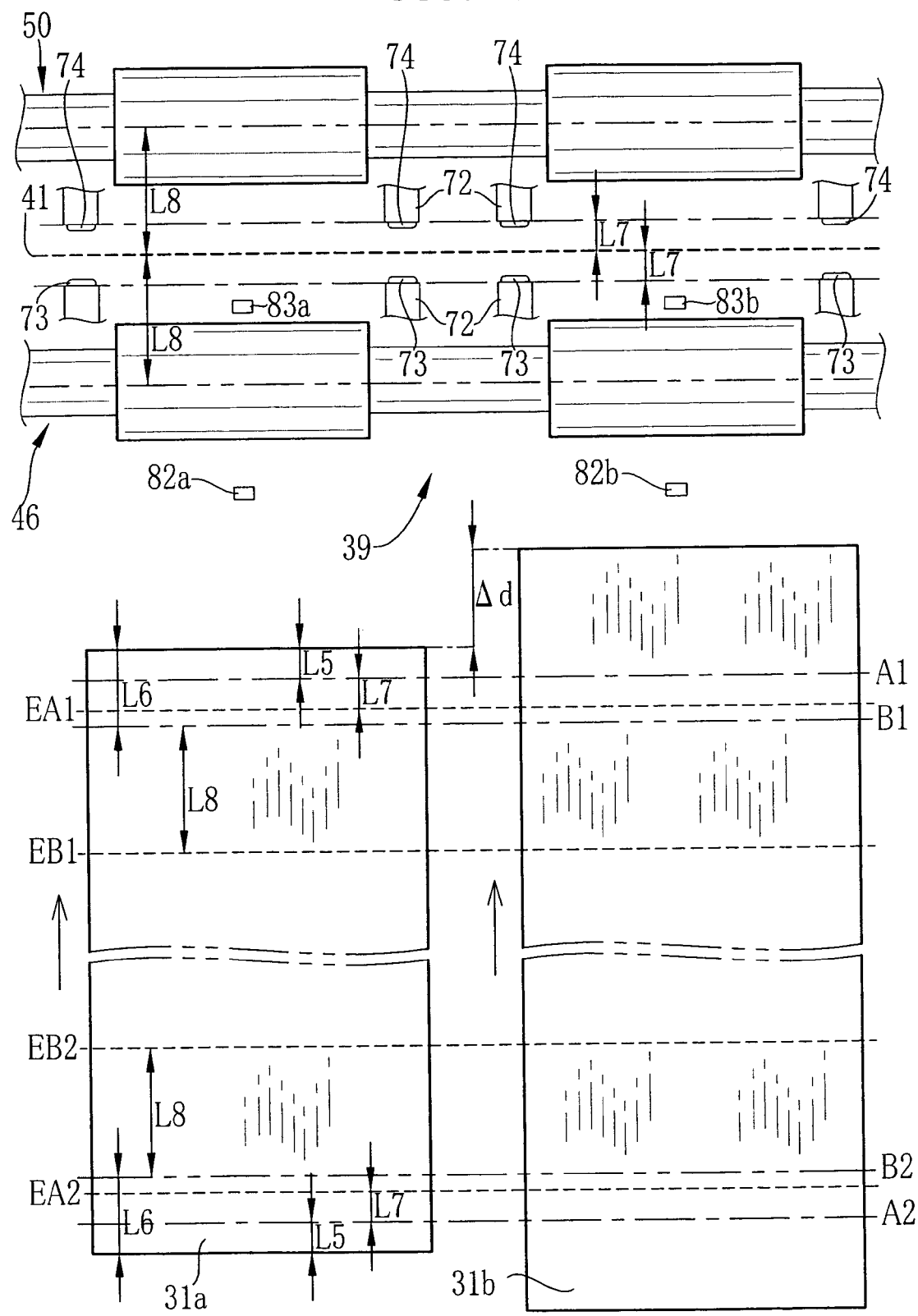
FIG. 15 is a schematic illustration showing the feeder viewed from the top thereof and showing a state in that the anterior ends of the recording-paper sheets fed in parallel are staggered and sizes thereof are different.

In the meantime, when the anterior ends of the paper sheets 31a and 31b having different sizes are staggered by Δd (the paper sheet 31a has a shorter size and the paper sheet 31b is ahead) such as shown in FIG. 15, the press-starting position A1 of the second press roller 74 and the nip-starting position B1 of the second nip roller 50 are determined on the basis of the position of the anterior end of the paper sheet 31a being behind. In addition, the nip-terminating position B2 of the first nip roller 46 and the press-terminating position of the first press roller 73 are determined on the basis of the posterior end of the paper sheet 31a having the shorter size. Also in this case, the image-exposure positions EA1 and EB1 are staggered, and the image-exposure positions EA2 and EB2 are staggered.

Incidentally, when the exposure is performed for the paper sheets 31a and 31b staggered such as shown in FIGS. 14 and 15, and when the shift amount Δd of the anterior ends is known, the image data to be recorded on the paper sheets 31a and 31b is stored in the image memory (not shown) of the exposing unit 38 in a state that the anterior ends are shifted by the shift amount Δd. By doing so, it is possible to record the images on the paper sheets 31a and 31b with great accuracy. When the shift amount Δd of the anterior ends falls in a predetermined range, exposing both the paper sheets 31a and 31b may be simultaneously commenced without shifting the image data to be recorded on the paper sheets 31a and 31b.

Such as described above, in the feeder 39 of this embodiment, it is unnecessary to dispose the first and second feed-roller pairs 43 and 44 in parallel such as described in the forgoing Publication No. 2003-241321 so that the mechanism there of maybe simplified. Further, it is possible to prevent the scanning unevenness from occurring due to slight vibration, which is caused relative to the adjacent rows at the time of nipping and at the time of releasing the nip. Thus, control may be easily performed. Such as shown in FIGS. 14 and 15, the image-exposure positions EA1 and EB1 are staggered, and the image-exposure positions EA2 and EB2 are staggered. In virtue of this, even if the scanning unevenness occurs, it is easily identified, by confirming the occurrence position of the scanning unevenness of the paper sheets 31a and 31b, that which of the nip rollers and the press rollers causes the scanning unevenness.

The exposed paper sheets 31a and 31b are carried from the exposure section 20 to the processing unit 22 wherein various processes of coloring/developing, fixing, washing and drying are executed. After that, the paper sheet is discharged to the outside of the photo printer 10 as the photo print.

In the photo printer 10 of the above embodiment, the paper sheets 31a and 31b are fed in two rows. However, the number of the paper-sheet rows is not limited to two, but may be three or more. In this case, the first and second feed-roller pairs 43 and 44 are exchanged so as to correspond to the row number of the paper sheets 31. In addition, the photo sensors are disposed in parallel so as to correspond to the increased number. Meanwhile, in the forgoing embodiment, the cam unit 52 is used to move the first and second nip rollers 46, 50 and the first and second press rollers 73, 74. The present invention, however, is not limited to this. The respective rollers 46, 50, 73 and 74 may be independently moved by shifting mechanisms provided for the respective rollers.

In the forgoing embodiment, the magazines 12 and 13 are vertically arranged in parallel. Instead of this arrangement, the paper sheets 31a and 31b may be arranged in parallel in the width direction thereof. Further, instead of disposing the plural magazines, a plurality of the recording-paper rolls 29 may be set in the sole magazine. Furthermore, a sorter (not shown) for moving the paper sheets 31a and 31b in the width direction thereof may be used to arrange the paper sheets 31a and 31b in parallel. When the sorter is employed, the positions of the paper sheets 31a and 31b in the scanning direction may be adjusted by using this sorter.

Figure 16:
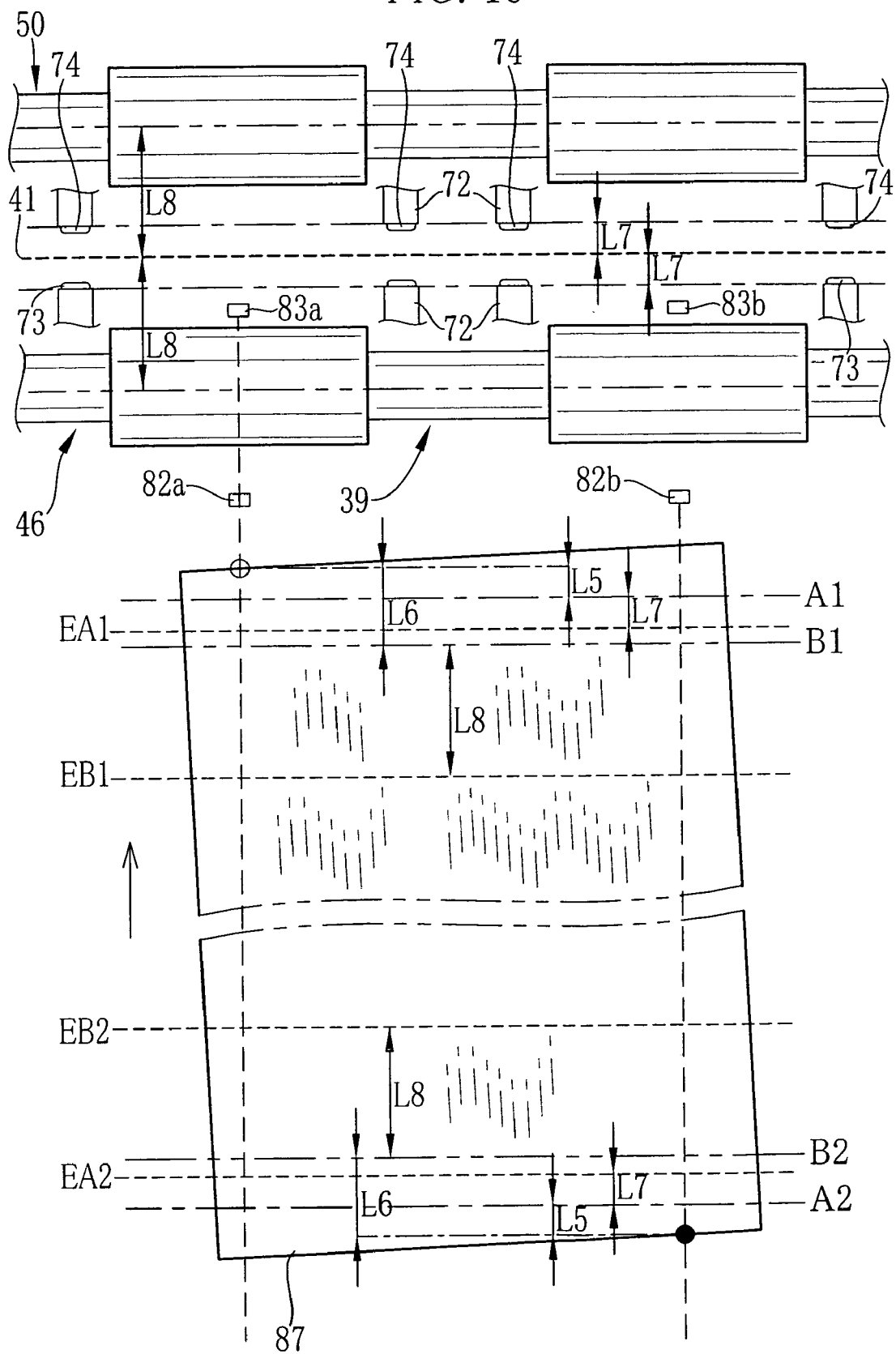
FIG. 16 is a schematic illustration showing the feeder viewed from the top thereof and showing a state in that the recording-paper sheet fed in a single row has a skew.

In the meantime, an application example of the feeder 39 is described below. When an image is recorded on a paper sheet 87 fed in a single row and in an inclined state such as shown in FIG. 16, a direction of the inclined paper sheet 87 is detected on the basis of time-difference information, which is obtained when the anterior end and the posterior end of the paper sheet 87 pass the photo sensors 82a and 82b. For example, in case the paper sheet 87 inclines in a counterclockwise direction, the press-starting position A1 of the second press roller 74 and the nip-starting position B1 of the second nip roller 50 may be determined on the basis of a delay side (shown by an indicia ○ in the drawing) of the anterior end of the paper sheet 87 detected by the photo sensor 82a. In addition, the nip-terminating position B2 of the first nip roller 46 and the press-terminating position A2 may be determined on the basis of an early side (shown by an indicia ● in the drawing) of the posterior end of the paper sheet 87 detected by the photo sensor 82b. Also in this case, in order to specify the roller having a cause of the scanning unevenness, it is preferable that the image-exposure positions EA1 and EB2 are staggered, and the image-exposure positions EA2 and EB2 are staggered.

In the forgoing embodiment, the second feed-roller pair 44 is switched to the nip position after the lastly detected anterior end of the paper sheets 31a and 31b has passed through the second feed-roller pair 44 kept in the nip-releasing state. Moreover, the first feed-roller pair 43 is switched to the nip-releasing state before the firstly detected posterior end leaves the first feed-roller pair 43 kept in the nip state. The present invention, however, is not exclusive to this. For example, when a degree of occurrence of the scanning unevenness is small, the first and second feed-roller pairs 43 and 44 kept in the nip state may be switched to a weak nip state, in which force for nipping the paper sheets 31a and 31b are weakened in comparison with the nip state, instead of being switched to the nip-releasing state.

Figure 17A:
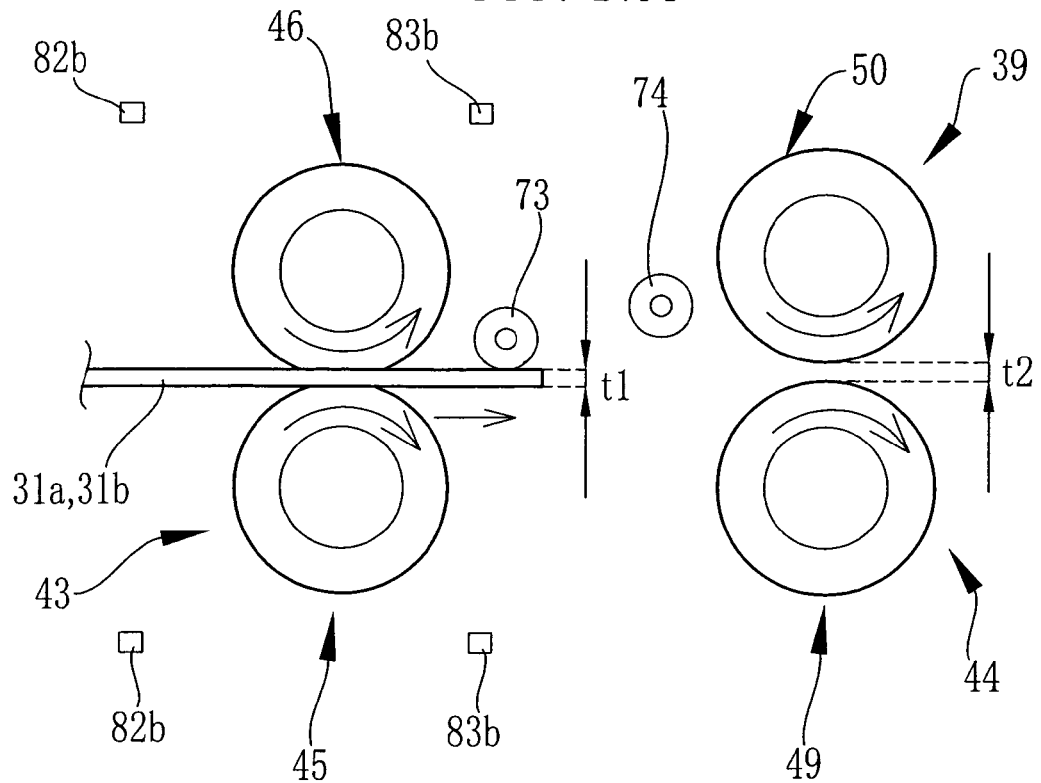
Figure 17B:
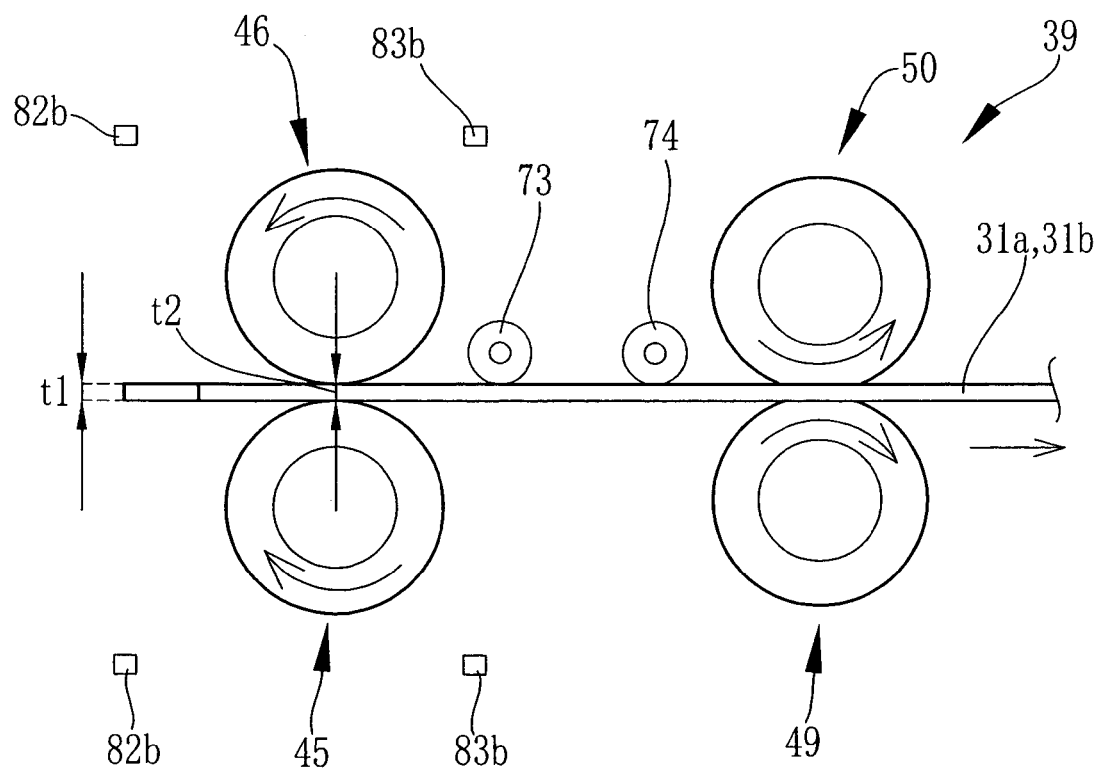

In this case, it is unnecessary to move the first and second nip rollers 46 and 50 respectively from the nip position to the release position. Such as shown in FIG. 17A, for instance, it is sufficient to move the second nip roller 50 to the weak nip position separated by a distance t2, which is equal to a thickness t1 of the paper sheets 31a and 31b, when the anterior ends of the paper sheets 31a and 31b pass through the second feed-roller pair 44. Further, when the posterior ends of the paper sheets 31a and 31b pass through the first feed-roller pair 43, it is similarly sufficient to move the first nip roller 46 to the weak nip position separated by the distance t2, such as shown in FIG. 17B.

Figure 18A:
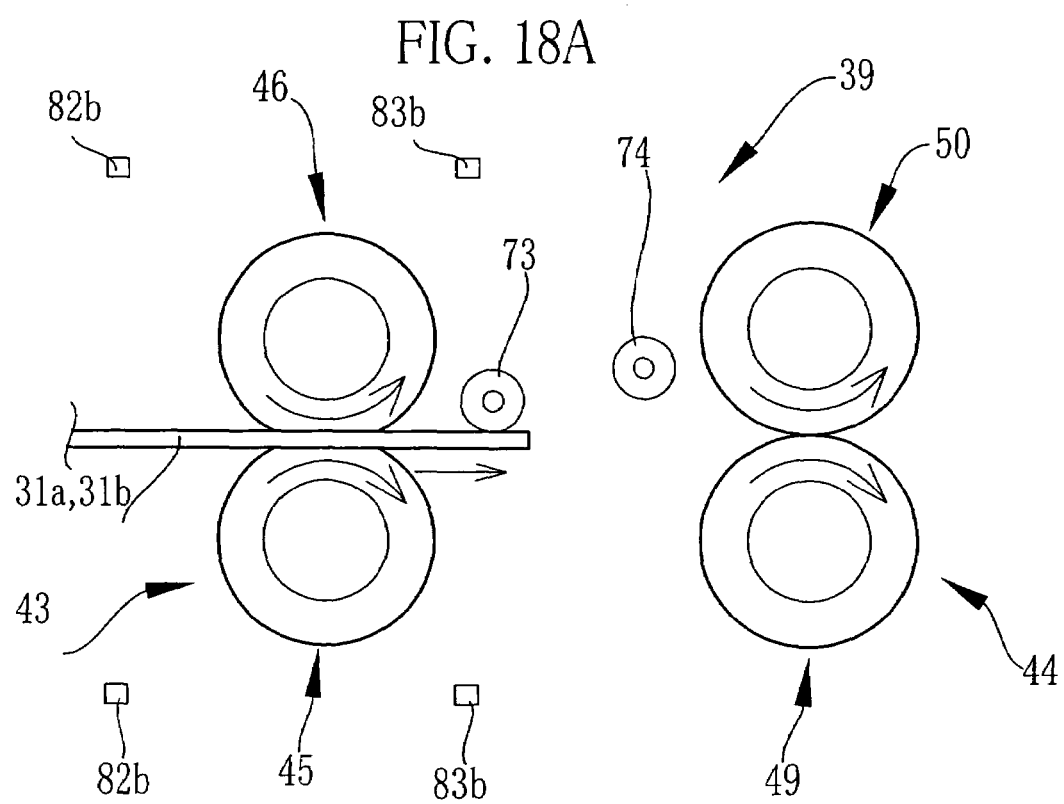
Figure 18B:
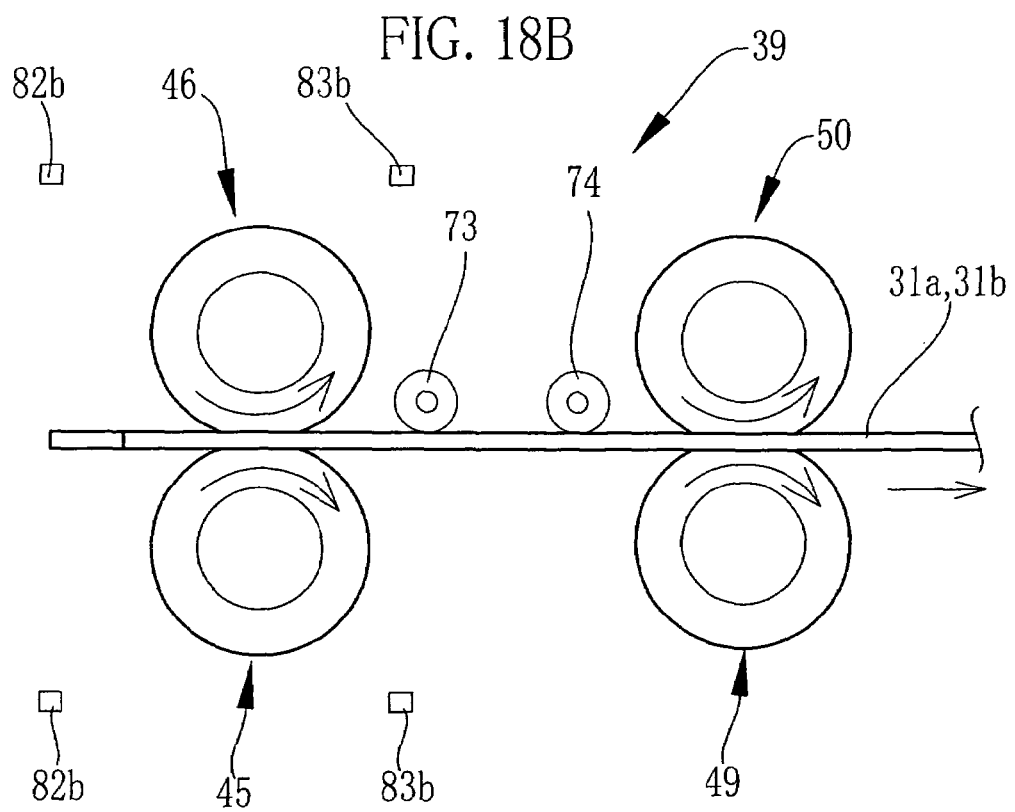

Instead of moving the first and second nip rollers 46 and 50 to the weak nip position, pressure force for pressing the first and second nip rollers 46 and 50 against the first and second capstan rollers 45 and 49 may be weakened in comparison with the nip state, such as shown in FIGS. 18A and 18b. In this case, it is sufficient to move the first and second nip rollers 46 and 50 from the nip position so as not to release the nip of the paper sheets 31a and 31b.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An image recording apparatus having a first feed-roller pair and a second feed-roller pair respectively disposed at an upstream side and a downstream side of a record position of a sheet-shaped recording material in a carrying direction, an image being recorded at said record position while said recording materials are fed in parallel by said first and second feed-roller pairs, said image recording apparatus comprising:
    a changing mechanism for changing said first and second feed-roller pairs between a nip state for nipping and feeding said recording materials, and one of a release state for releasing said recoding material and a weak nip state for weakening a nipping force of said recording material in comparison with said nip state;
    a detector for detecting passing of said recording materials at each row thereof; and
    a controller for controlling said changing mechanism on the basis of a detection result of said detector so as to change said second feed-roller pair to said nip state after a lastly detected anterior end of said recording materials fed by said first feed-roller pair in parallel has passed through said second feed-roller pair kept in one of said release state and said weak nip state.

2. An image recording apparatus according to claim 1, wherein said first and second feed-roller pairs include first and second drive rollers to be driven by a motor, and first and second movable rollers to be moved by said changing mechanism between a nip position for nipping said recording material with said first and second drive rollers and a release position for releasing a nip of said recording material.

3. An image recording apparatus according to claim 2, further comprising:
    a position adjuster for adjusting positions of the respective recording materials in a width direction thereof such that outermost lateral sides of said recording materials fed in parallel are situated at symmetrical positions about a center line of a balance of nipping by the first and second movable rollers.

4. An image recording apparatus according to claim 1, further comprising:
    a carrying guide for supporting said recording materials fed in parallel;
    a plurality of first press rollers for pressing said recording material against said carrying guide between said first feed-roller pair and said record position; and
    a plurality of second press rollers for pressing said recording material against said carrying guide between said record position and said second feed-roller pair,
    wherein said first and second press rollers are respectively changed by said changing mechanism between a press state for pressing said recoding material, and a press-releasing state for releasing a press of said recording material, and
    said controller controls said changing mechanism on the basis of a detection result of said detector such that said second press roller is changed to said press state after the lastly detected anterior end of said recording materials fed by said first feed-roller pair in parallel has passed said second press roller kept in said press-releasing state, and said first press roller is changed to said press-releasing state before a firstly detected posterior end of said recording materials leaves said first press roller kept in said press state.

5. An image recording apparatus according to claim 4, wherein said controller controls said changing mechanism so as to stagger a first image-recording position and a second image-recording position of said recording material on which the image is recorded at said record position, said image being recorded at said first image-recording position when said first feed-roller pair kept in said nip state is changed to one of said release state and said weak nip state, and said image being recorded at said second image-recording position when said first press roller kept in said press state is changed to said press-releasing state.

6. An image recording apparatus according to claim 4, wherein said controller controls said changing mechanism so as to stagger a first image-recording position and a second image-recording position of said recording material on which the image is recorded at said record position, said image being recorded at said first image-recording position when said second feed-roller pair kept in one of said release state and said weak nip state is changed to said nip state, and said image being recorded at said second image-recording position when said second press roller kept in said press-releasing state is changed to said press state.

7. An image recording apparatus according to claim 4, further comprising:
    a first arm whose one end supports said first press roller, the other end of said first arm being swingably supported and said first press roller being changed between said press state and said press-releasing state by swinging said first arm; and
    a second arm whose one end supports said second press roller, the other end of said second arm being swingably supported and said second press roller being changed between said press state and said press-releasing state by swinging said second arm.

8. An image recording apparatus according to claim 1, wherein said detector includes sensors for single-row use, which are disposed for the respective rows of said recording materials fed in parallel.

9. An image recording apparatus according to claim 1, wherein said detector is a line-shaped sensor capable of detecting passing of said recording materials, which are fed in parallel, at the respective rows thereof.

10. An image recording apparatus having a first feed-roller pair and a second feed-roller pair respectively disposed at an upstream side and a downstream side of a record position of a sheet-shaped recording material in a carrying direction, an image being recorded at said record position while said recording materials are fed in parallel by said first and second feed-roller pairs, said image recording apparatus comprising:
- a changing mechanism for changing said first and second feed-roller pairs between a nip state for nipping and feeding said recording materials, and one of a release state for releasing said recoding material and a weak nip state for weakening a nipping force of said recording material in comparison with said nip state;
- a detector for detecting passing of said recording materials at each row thereof; and
- a controller for controlling said changing mechanism on the basis of a detection result of said detector so as to change said first feed-roller pair to one of said release state and said weak nip state before a firstly detected posterior end of said recording materials fed by said first feed-roller pair in parallel leaves said first feed-roller pair kept in said nip state.

11. An image recording apparatus according to claim 10, wherein said first and second feed-roller pairs include first and second drive rollers to be driven by a motor, and first and second movable rollers to be moved by said changing mechanism between a nip position for nipping said recording material with said first and second drive rollers and a release position for releasing a nip of said recording material.

12. An image recording apparatus according to claim 11, further comprising:
- a position adjuster for adjusting positions of the respective recording materials in a width direction thereof such that outermost lateral sides of said recording materials fed in parallel are situated at symmetrical positions about a center line of a balance of nipping by the first and second movable rollers.

13. An image recording apparatus according to claim 10, further comprising:
- a carrying guide for supporting said recording materials fed in parallel;
- a plurality of first press rollers for pressing said recording material against said carrying guide between said first feed-roller pair and said record position; and
- a plurality of second press rollers for pressing said recording material against said carrying guide between said record position and said second feed-roller pair,
- wherein said first and second press rollers are respectively changed by said changing mechanism between a press state for pressing said recoding material, and a press-releasing state for releasing a press of said recording material, and
- said controller controls said changing mechanism on the basis of a detection result of said detector such that said second press roller is changed to said press state after a lastly detected anterior end of said recording materials fed by said first feed-roller pair in parallel has passed said second press roller kept in said press-releasing state, and said first press roller is changed to said press-releasing state before the firstly detected posterior end of said recording materials leaves said first press roller kept in said press state.

14. An image recording apparatus according to claim 13, wherein said controller controls said changing mechanism so as to stagger a first image-recording position and a second image-recording position of said recording material on which the image is recorded at said record position, said image being recorded at said first image-recording position when said first feed-roller pair kept in said nip state is changed to one of said release state and said weak nip state, and said image being recorded at said second image-recording position when said first press roller kept in said press state is changed to said press-releasing state.

15. An image recording apparatus according to claim 13, wherein said controller controls said changing mechanism so as to stagger a first image-recording position and a second image-recording position of said recording material on which the image is recorded at said record position, said image being recorded at said first image-recording position when said second feed-roller pair kept in one of said release state and said weak nip state is changed to said nip state, and said image being recorded at said second image-recording position when said second press roller kept in said press-releasing state is changed to said press state.

16. An image recording apparatus according to claim 13, further comprising:
- a first arm whose one end supports said first press roller, the other end of said first arm being swingably supported and said first press roller being changed between said press state and said press-releasing state by swinging said first arm; and
- a second arm whose one end supports said second press roller, the other end of said second arm being swingably supported and said second press roller being changed between said press state and said press-releasing state by swinging said second arm.

17. An image recording apparatus according to claim 10, wherein said detector includes sensors for single-row use, which are disposed for the respective rows of said recording materials fed in parallel.

18. An image recording apparatus according to claim 10, wherein said detector is a line-shaped sensor capable of detecting passing of said recording materials, which are fed in parallel, at the respective rows thereof.

19. A recording-material feeding method for an image recording apparatus having a first feed-roller pair and a second feed-roller pair respectively disposed at an upstream side and a downstream side of a record position of a sheet-shaped recording material in a carrying direction, an image being recorded at said record position while said recording materials are fed in parallel by said first and second feed-roller pairs, said recording-material feeding method comprising the steps of:
- enabling said first and second feed-roller pairs to move between a nip state for nipping and feeding said recording material, and one of a release state for releasing a nip of said recording material and a weak nip state for weakening a nipping force of said recording material in comparison with said nip state;
- detecting passing of said recording materials, which are fed in parallel, at respective rows thereof; and
- changing said second feed-roller pair to said nip state on the basis of a detected result after a lastly detected anterior end of said recording materials fed by said first feed-roller pair in parallel has passed through said second feed-roller pair kept in one of said release state and said weak nip state.

20. A recording-material feeding method for an image recording apparatus having a first feed-roller pair and a second feed-roller pair respectively disposed at an upstream side and a downstream side of a record position of a sheet-shaped recording material in a carrying direction, an image being recorded at said record position while said recording materials are fed in parallel by said first and second feed-roller pairs, said recording-material feeding method comprising the steps of:

enabling said first and second feed-roller pairs to move between a nip state for nipping and feeding said recording material, and one of a release state for releasing a nip of said recording material and a weak nip state for weakening a nipping force of said recording material in comparison with said nip state;

detecting passing of said recording materials, which are fed in parallel, at respective rows thereof; and changing said first feed-roller pair to one of said release state and said weak nip state on the basis of a detected result before a firstly detected posterior end of said recording materials fed by said first feed-roller pair in parallel leaves said first feed-roller pair kept in said nip state.

* * * * *